(12) United States Patent
Yen

(10) Patent No.: US 12,081,843 B2
(45) Date of Patent: *Sep. 3, 2024

(54) SYSTEM AND METHOD FOR IDENTIFYING ALTERED CONTENT

(71) Applicant: Rovi Guides, Inc., San Jose, CA (US)

(72) Inventor: Bruce Yen, San Jose, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,435

(22) Filed: Apr. 19, 2023

(65) Prior Publication Data

US 2023/0262298 A1 Aug. 17, 2023

Related U.S. Application Data

(63) Continuation of application No. 17/411,589, filed on Aug. 25, 2021, now Pat. No. 11,665,408, which is a
(Continued)

(51) Int. Cl.
*H04N 21/83* (2011.01)
*G06T 1/00* (2006.01)
(Continued)

(52) U.S. Cl.
CPC ....... *H04N 21/8358* (2013.01); *G06T 1/0028* (2013.01); *G06V 20/48* (2022.01); *G06V 20/49* (2022.01)

(58) Field of Classification Search
None
See application file for complete search history.

(56) References Cited

U.S. PATENT DOCUMENTS 7,017,045 B1 * 3/2006 Krishnamachari ... G06T 1/0071
380/54
7,761,892 B2 7/2010 Ellis et al.
(Continued)

FOREIGN PATENT DOCUMENTS

| CN | 104581431 A | 4/2015 |
| WO | 2004034325 A1 | 4/2004 |
| WO | 2008066930 A2 | 6/2008 |

OTHER PUBLICATIONS

International Search Report and Written Opinion of PCT/US2020/020639 dated May 18, 2020.
(Continued)

*Primary Examiner* — Cai Y Chen
(74) *Attorney, Agent, or Firm* — HALEY GUILIANO LLP

(57) ABSTRACT

Methods and systems for identifying altered content are described herein. The system generates a fingerprint for an unverified content item and locates a plurality of content items that match the fingerprint. The system then compares corresponding frames between the unverified content item and each content item of the plurality of content items. The system identifies, based on the comparing, an altered frame in the unverified content item that does not match a corresponding frame in two or more of the plurality of content items. The system also determines that one or more frames of the unverified content item that follow the altered frame match corresponding frames in the two or more of the plurality of content items. The system then generates for display an indication that the unverified content item contains one or more altered frames.

20 Claims, 15 Drawing Sheets

Related U.S. Application Data continuation of application No. 16/364,539, filed on Mar. 26, 2019, now Pat. No. 11,134,318.

(51) Int. Cl.
*G06V 20/40* (2022.01)
*H04N 21/8358* (2011.01)

(56) References Cited

U.S. PATENT DOCUMENTS

| | | | |
|---|---|---|---|
| 9,544,621 B2* | 1/2017 | Weich | G06F 16/783 |
| 10,735,381 B2 | 8/2020 | Brock et al. | |
| 11,106,827 B2 | 8/2021 | Yen | |
| 11,134,318 B2 | 9/2021 | Yen | |
| 11,665,408 B2 | 5/2023 | Yen | |
| 2009/0328237 A1 | 12/2009 | Rodriguez et al. | |
| 2013/0085825 A1* | 4/2013 | Davis | G06Q 30/06 705/310 |
| 2015/0289013 A1* | 10/2015 | Nelson | H04N 21/25891 725/19 |
| 2016/0087735 A1 | 3/2016 | Anniballi et al. | |
| 2017/0316802 A1 | 11/2017 | Brock et al. | |
| 2017/0371962 A1 | 12/2017 | Bilobrov | |
| 2018/0082121 A1 | 3/2018 | Stern et al. | |
| 2019/0286911 A1 | 9/2019 | Smith et al. | |
| 2020/0311311 A1 | 10/2020 | Yen | |
| 2020/0314507 A1 | 10/2020 | Yen | |
| 2021/0357534 A1 | 11/2021 | Yen | |
| 2021/0385556 A1 | 12/2021 | Yen | |

OTHER PUBLICATIONS

Upadhyay, Saurabh, "Video Authentication: Issues and Challenges", Upadhyay et al., Video Authentication: Issues and challenges, IJCSI International Journal of Computer Science Issues, 9:(3) 409-418, Issue 1 (2012), Jan. 2012.
U.S. Appl. No. 16/364,539, filed Mar. 26, 2019, Bruce Yen.
U.S. Appl. No. 16/364,549, filed Mar. 26, 2019, Bruce Yen.
U.S. Appl. No. 17/388,188, filed Jul. 29, 2021, Bruce Yen.
U.S. Appl. No. 17/411,589, filed Aug. 25, 2021, Bruce Yen.
EP Search Report for EP Application No. 23205657.2, Mailed Apr. 24, 2024.

* cited by examiner

200

300

1400

| Content Item | Content Type | Clusters of Altered Content | % Altered Content | Modification Types | Source | Number of Sources | Time of Release | Veracity Level | Risk Factor |
|---|---|---|---|---|---|---|---|---|---|
| News Clip | Video | 200, 100, 100 (Frames) | 0.4% | Altered Frames | Online News Source | 42,000 | Date A, Time B | 5% | High |
| Music Video | Video | 1200, 1200 (Frames) | 3% | Added Frames, Deleted Frames | OTT Source | 20 | Date C, Time D | 95% | Low |
| Interview Soundbyte | Audio | 1, 1 (Seconds) | 1% | Added Audio, Deleted Audio | Broadcast News Channel | 1,000 | Date E, Time F | 55% | Medium |
| Screenshot | Image | 600x1500 (Pixels) | 12.5% | Altered Portion | Social Media Platform | 25,000 | Date G, Time H | 10% | Medium-High |

1402 — News Clip row
1404 — Music Video row
1406 — Interview Soundbyte row
1408 — Screenshot row

FIG. 14

SYSTEM AND METHOD FOR IDENTIFYING ALTERED CONTENT

CROSS-REFERENCE TO RELATED APPLICATIONS

This application is a continuation of U.S. patent application Ser. No. 17/411,589, filed Aug. 25, 2021, which is a continuation of U.S. patent application Ser. No. 16/364,539, now U.S. Pat. No. 11,134,318, filed Mar. 26, 2019, which are hereby incorporated by reference herein in their entireties.

BACKGROUND

The present disclosure is directed to content verification systems and, more particularly, to identifying when content has been altered.

SUMMARY

Media content, including text, audio, and video content, continues to play an important role in the daily lives of consumers. Consumers rely on media content for entertainment, education, current events, social connection, and so on. Recent improvements to content creation and content editing have dramatically increased the ease of modifying content, even after that content has been published to consumers. Developments in audio and video technology have led to audio and video editing software that may be used to fabricate or modify media content to depict realistic media content nearly indistinguishable from an original version, whether it is recorded or live content. For example, companies have created software that, after a period of learning, can mimic a first individual's voice such that another individual may use that software to create an audio recording nearly indistinguishable from a true recording of that first individual speaking. Other software allows users to record video of a user's changing facial expressions and movements to cause an animated animal face to mirror such facial expressions and movements.

The rise of content modification technology, combined with nefarious interests in manipulating consumers' understanding and perception of reality, leads to a need for systems and methods of detecting whether content is authentic. Traditional security and authentication measures include encoding/encrypting content and then decoding/decrypting at an authorized source using keys, watermarks or hardware. But these technologies do not protect users who are consuming content that is being spread quickly across the Internet (e.g., via social media). The traditional systems are reliant on controlling content before it makes it into common space and is being shared across users (e.g., posted on social networks). These systems do not, however, identify whether content that is already in the ecosystem is authentic as compared to its original source.

Furthermore, there may be legitimate re-uses of content that include editing content to produce highlights, embedding a clip into a second clip for commentary, highlighting portions of content, and dubbing audio for a second language. Depending on the content type, e.g., a sports clip versus a press conference, different degrees of changes may be acceptable. Traditional systems do not, however, account for these nuances. Furthermore, traditional systems may not recognize that in some instances, a small amount of change is more insidious than a large amount of change. For example, in a case of trying to alter the public's perception of an event, a small amount of change may be more likely to be accepted as an accurate portrayal of events and still bias the viewership. Content, such as a news clip or recording of live events, may be flagged with a small amount of change and not flagged when there is a large amount change, which could indicate an acceptable modification. With conventional systems, there is no efficient mechanism to determine the extent and fashion to which content has been modified given these nuances.

There are several techniques that can be used to compare the unverified content item with other items (e.g., source content items or verified content items). Once the system has one or more content items for comparison with the unverified content item, the system identifies a frame within each of the content items that corresponds to a frame within the unverified content item. Some unverified content items (e.g., news broadcasts, OTT media, etc.) may insert a video segment into the stream. The video segment may occupy the full display or may be a picture-in-picture (PiP) inset. The system may identify the full screen for comparison or may identify just the PiP inset for comparison. Once the system has identified which portion of the display to use for comparison, the system uses these as root frames from which the comparison between the unverified content item and other items can begin. Starting at the root frames, the system compares frames following the root frame of the unverified content item with corresponding frames in the other content items. If all the frames match, then the system considers the unverified item verified. When the system determines that a frame in the unverified content item is altered (e.g., a sufficient number of rendered pixels do not match frames in the other content items), it can perform secondary analysis to determine whether to mark the unverified content item as altered. In one embodiment, the system subsequently detects that frames that occur after altered frames match corresponding frames in the other content items; i.e., the unverified content item begins to match the other content items after the detected alteration. Thus, the system can consider the fact that the unverified content item is going back and forth between matching frames and altered frames (i.e., from matching and non-matching content) as an indication that the unverified content is not authentic or lacks veracity. When such a determination is made, the system can generate an indication that the unverified content item contains one or more altered frames for display to a viewer.

The system described herein thus has several benefits over conventional systems for analyzing the veracity of content. The system can analyze content after it has been put into the ecosystem of media content (e.g., posted on a social network platform) and identify whether the media content that is being viewed by a second user has been altered from its original state. Furthermore, the disclosed verification system can account for highlights and content cuts when an unverified content item does not fully match the comparison version. The disclosure also has the benefit over conventional systems of being customizable based on, for example, the type of content being analyzed, so that different levels of alterations are acceptable depending on the type of content being reviewed. Thus, the system disclosed herein can tailor verification of content to more accurately verify content when even a small amount of modification exists.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 14 shows an illustrative set of factors used to calculate veracity level and risk factor, in accordance with some embodiments of the present disclosure.

DETAILED DESCRIPTION

Methods and systems are described herein for identifying altered content by comparing content items with matching fingerprints. Based on the comparison, the system determines which portions, if any, of the content have been modified. The system may then generate for display an indication that the content has been altered.

Figure 1:
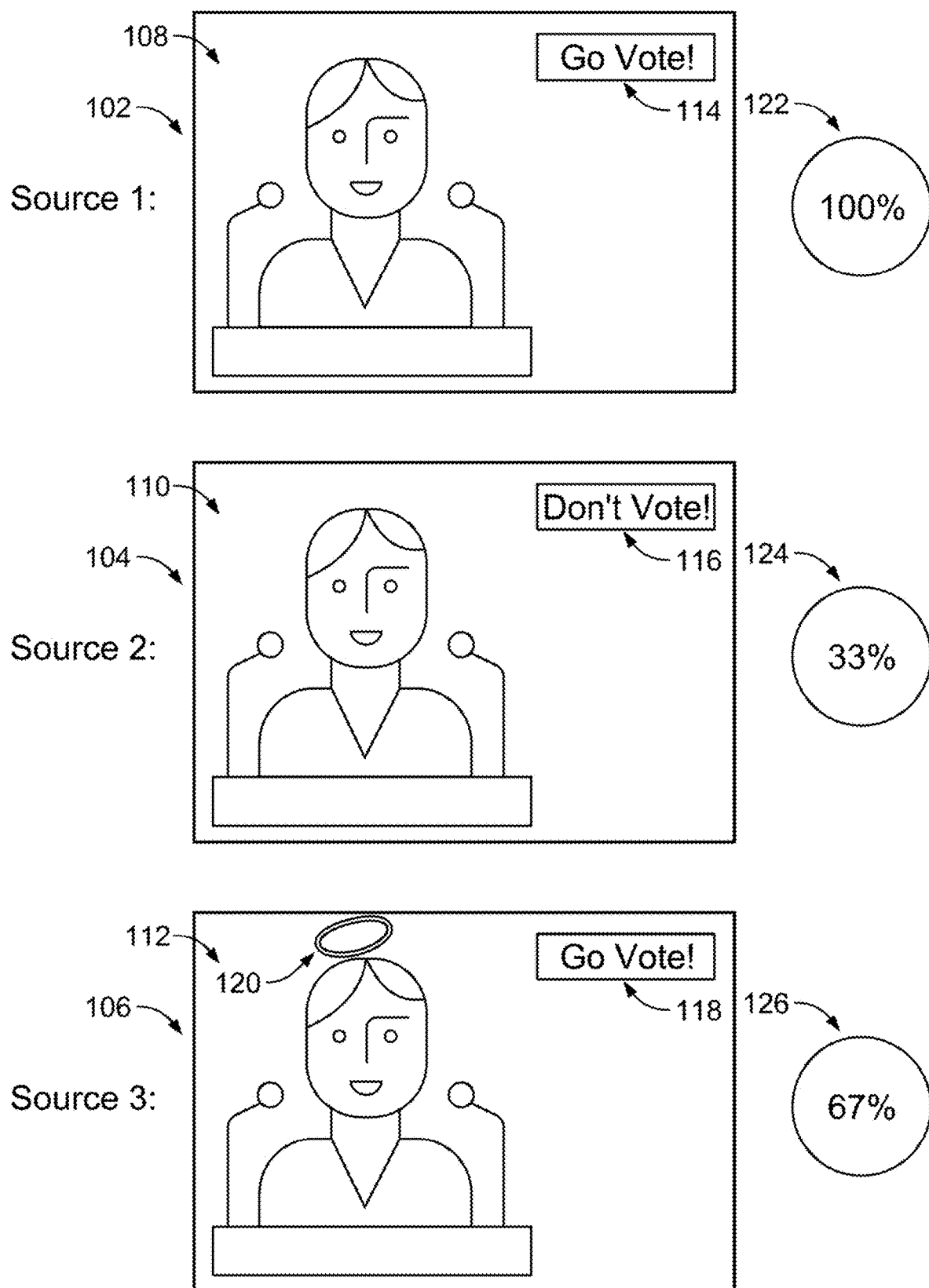
FIG. 1 shows an illustrative comparison of three corresponding frames from content items, in accordance with some embodiments of the present disclosure.

FIG. 1 illustrates multiple versions of the same content. In FIG. 1, the system may receive content items (e.g., content items 102, 104, and 106) from a database (e.g., media content source 602), the Internet, a user upload, or another source. The system may generate a fingerprint corresponding to each content item (e.g., each of content items 102, 104, and 106). The system may then identify reference items with fingerprints that match the fingerprints of the content items. The system may identify a root frame for each content item. In some embodiments, a root frame may be a frame in a content item that appears first in the content item, that contains identifying features, or that has been identified as important in the metadata. For example, content items such as content items 102, 104, and 106 may possess root frames that depict a speaker at a podium. The system then compares frames following the root frame in each of the content items (e.g., content items 102, 104, and 106) with corresponding frames in the reference content items. For example, the system uses frames 108, 110, and 112 as reference frames. Based on overlaying, comparing, or otherwise analyzing the frames from the content items and the frames from the reference items, the system may determine whether or not the frames match. The system may check whether objects that are visible within the frame are located in the same region and contain the same details across frame comparisons. The system may compare frame 108 with a corresponding frame from a reference item and determine that the frames match completely. The system may then generate for display an indication that the content item has not been altered (e.g., indication 122).

In an alternative example, when the system compares a frame from another content item (e.g., frame 110) with a reference frame, the system may identify a mismatch. The system may identify that an object in the frame has been altered. For example, frame 110 contains object 116, which has been altered to read "DON'T VOTE!" instead of "GO VOTE!" The system may determine the importance of this alteration to the frame and to the content item. For example, the system calculates the percentage of the area of the frame that has been altered. Additionally or alternatively, the system may analyze the metadata to determine if the altered object has been tagged as important or unimportant. Based on the system's determination, the system may generate for display an indication of the extent to which the frame has been altered. For example, the system determines that the change from "GO VOTE!" to "DON'T VOTE!" is significant and may therefore score the veracity of the content item as 33% (e.g., indication 124).

In another example, the system may determine a less significant mismatch between a frame of a content item (e.g., frame 112) and a frame of a reference item. The system may identify that most objects in the frame (e.g., object 118) match the objects in the reference frame. The system may identify an object (e.g., object 120) that does not appear in the reference frame. The system may calculate a percentage of the area of the frame that the object covers, compare the object to objects in an external database (e.g., media content source 602) to identify the meaning of the object, determine if the object covers any important objects that match the objects in the reference frame, and perform a series of other analyses. Based on these analyses, the system may determine that the addition of object 120 does not significantly alter the frame. The system may then display a higher score (e.g., indication 126) for the veracity of the content item. Based on the indications associated with each content item (e.g., indications 122, 124, and 126), a user may select which content item to view. If accuracy is a deciding factor, the user may choose to watch content item 102. However, if the user identifies a content item with a lower veracity score (e.g., content items 104 or 106) as a spoof or parody, the user may opt to view a content item with a lower veracity score because the content item may be more appealing to the user by other standards.

Figure 2:
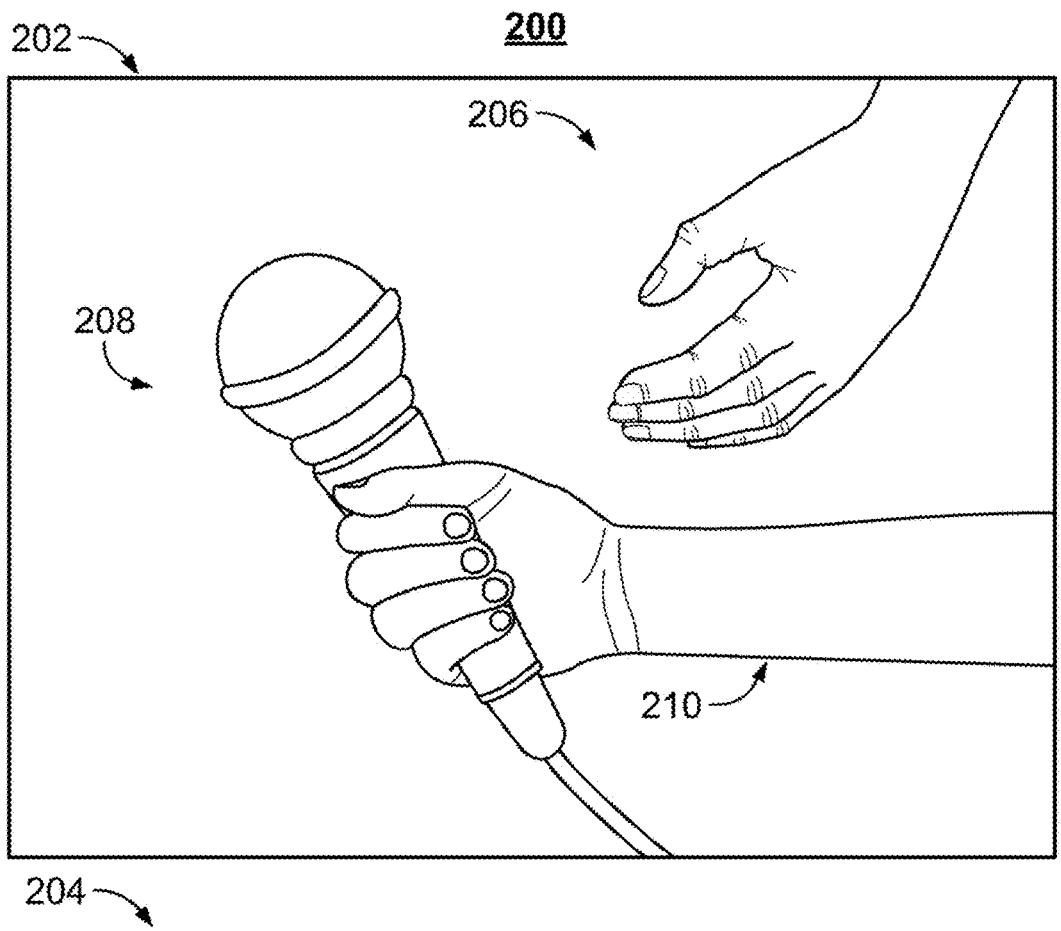
FIG. 2 shows an illustrative comparison of a frame in an unverified content item and a corresponding frame in another content item, in accordance with some embodiments of the present disclosure.
Figure 2:
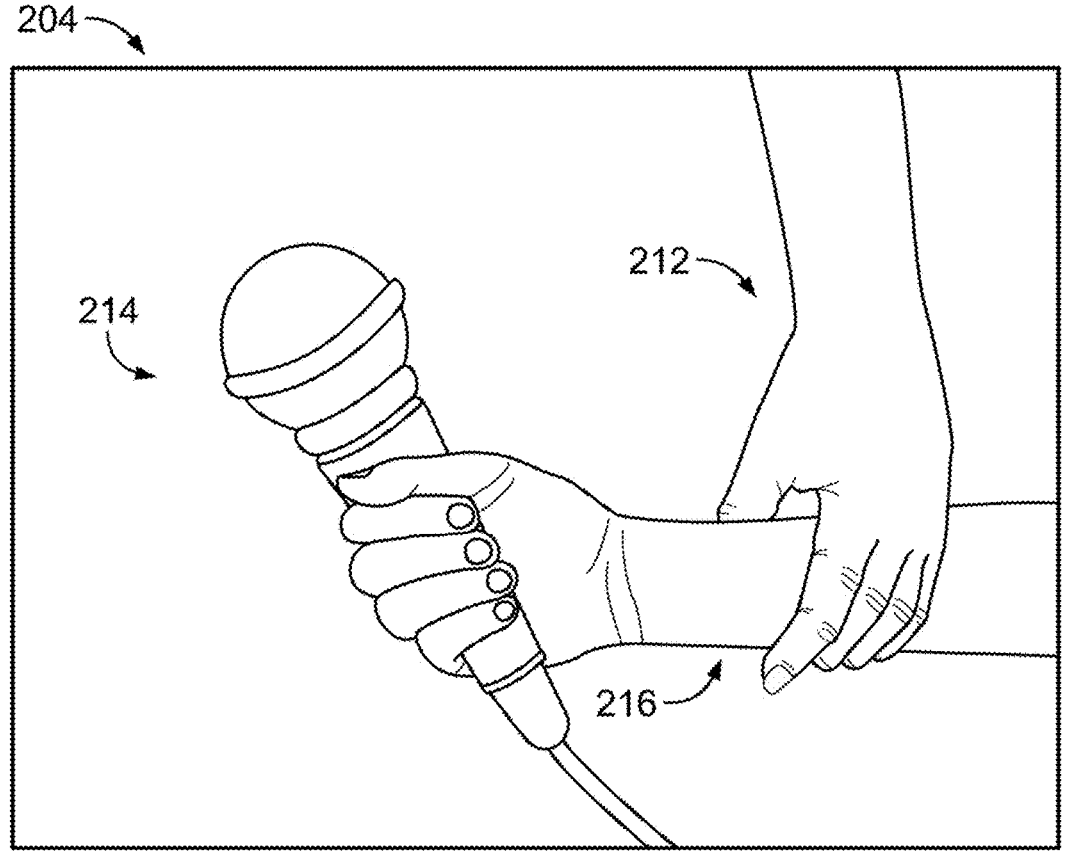

FIG. 2 illustrates a comparison between two frames (e.g., frames 202 and 204) in content items. For example, a first frame (e.g., frame 202) may depict a first object (e.g., hand 206) in close proximity to a second object (e.g., microphone 208). The first frame (e.g., frame 202) may show a space separating the first object (e.g., hand 206) from a third object (e.g., arm 210). The system may compare this frame to one or more reference frames and determine that this frame is unaltered. The system may therefore assign a high veracity score to frame 202. However, when the system compares a second frame (e.g., frame 204) with a reference frame, the system may identify that the frame has been altered. In this example, frame 204 and the reference frame contain the same objects, but the objects have been moved within the frame (e.g., frame 204) with respect to one another. In frame 204, the first object (e.g., hand 212) has been moved with respect to the second object (e.g., microphone 214) and the third object (e.g., arm 216). The hand 212 has been moved farther away from the microphone 214 and is overlapping with arm 216. The system may seek to determine whether the movement of the objects in the frame with respect to one another alters the meaning of the frame and the meaning of the content item. The system may analyze the metadata to determine if the orientation of the objects is significant to the meaning of the content item. The system may additionally or alternatively search the Internet to determine media (e.g., news articles, news broadcasts, postings, and other media) related to the content item. Based on these analyses, the system may determine that the orientation is significant and may therefore assign the altered frame a lower veracity score.

Figure 3:
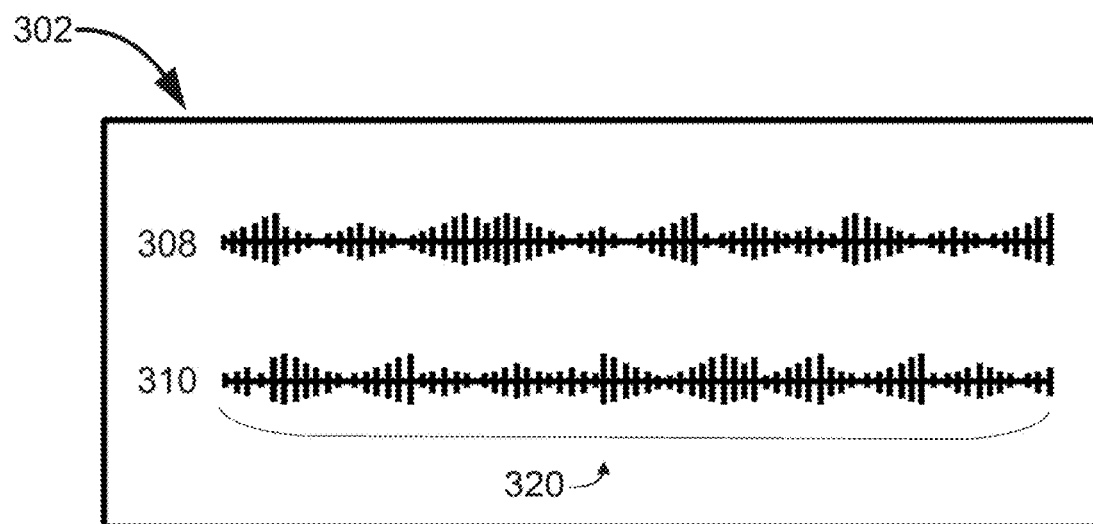
FIG. 3 shows an illustrative comparison between audio profiles in unverified audio tracks and corresponding audio profiles in other audio tracks, in accordance with some embodiments of the present disclosure.
Figure 3:
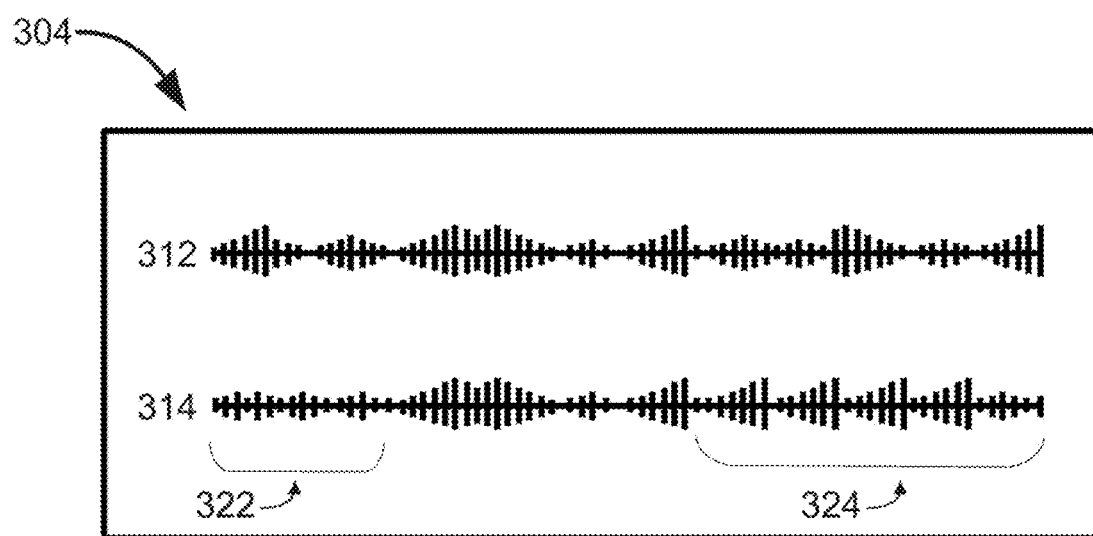
Figure 3:
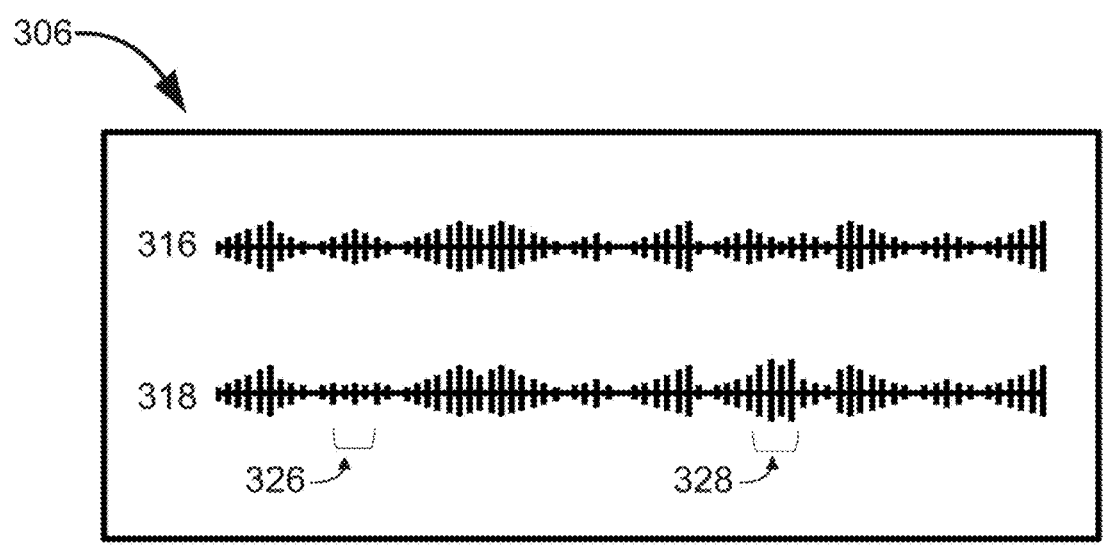

FIG. 3 depicts multiple audio profile comparisons. The system may first generate a fingerprint for an unverified audio clip (e.g., audio clip 310, audio clip 314, or audio clip 318). The system may then search through a database (e.g., media content source 602), the Internet, or another source for a reference audio clip with a similar or matching fingerprint. The system may run comparisons between each unverified audio clip and the reference audio clip (e.g., audio clip 308, audio clip 312, and audio clip 316). The system may compare the shape of the profile, the strength of the volume at each given time, lyrics identified in the metadata, and any other identifying factors for each audio clip. The system may scale the profiles to the same strength, volume, style, or other factor before performing the comparison. For example, if the system receives the audio profiles from different sources, the profiles may be displayed, stored, or played back differently. The system may first run a normalizing process on the audio profiles in order to convert them to the same format for comparison. In the first comparison (e.g., comparison 302), the system compares a reference profile (e.g., audio profile 308) and an unverified profile (e.g., audio profile 310). Based on analyzing the shapes, volumes, lyrics, and other factors, the system may determine that the profiles (e.g., audio profile 308 and audio profile 310) do not contain any matching portions. The system may therefore determine that the audio has been significantly altered in a way that is not intended to deceive a listener. For example, a song may have been remixed, dubbed, used as a background track, or turned into a parody. The system may therefore determine that the content has been altered in an acceptable manner and may assign a high veracity score or no veracity score at all.

In another example, comparison 304 depicts a reference profile (e.g., audio profile 312) and an unverified profile (e.g., audio profile 314). The system may determine that two portions (e.g., portion 322 and portion 324) of the unverified profile (e.g., audio profile 314) do not match the corresponding portions of the reference profile (e.g., audio profile 312). The system may identify that the mismatched portions fall at the beginning and end of the audio profiles. The system may further determine that the portions make up a large percentage of the audio profile and therefore of the corresponding audio clip. Based on the placements and lengths of the mismatched portions, the system may determine that the mismatched portions represent different audio clips (e.g., the mismatched portions may be different introductions and conclusions to the audio clip). The system may determine that it is not necessary to flag the unverified audio clip corresponding to audio profile 314 as "modified." The system may therefore assign a high veracity score or no veracity score at all.

In another example, comparison 306 depicts a reference profile (e.g., audio profile 316) and an unverified profile (e.g., audio profile 318). The system may again determine that two portions (e.g., portion 326 and portion 328) of the unverified profile (e.g., audio profile 318) do not match the corresponding portions of the reference profile (e.g., audio profile 316). However, in this example, the two mismatched portions (e.g., portion 326 and portion 328) fall in the middle of the audio profile. The lengths of the mismatched portions form a small percentage of the audio profile and therefore of the corresponding audio clip. The placements and lengths of the mismatched portions (e.g., portion 326 and portion 328) indicate that there are segments of modified audio content surrounded by original audio content. This may cause the system to determine that the audio clip has been modified in a deceptive manner and therefore the system may generate for display an indication that the unverified audio clip has been altered.

In some embodiments, the system may analyze audio tracks for patterns. For example, an audio profile with a repeated soundbite, shape, or other pattern may indicate that the audio track has been modified. In some embodiments, the system may analyze audio tracks for inconsistencies. For example, an audio track may switch to a different baseline volume for a short period before returning to normal. In another example, the audio profile may display an inconsistency, such as a sharp variation from the normal shape of the profile. Such inconsistencies may indicate modifications and may alert the system to fabricated content.

Figure 4:
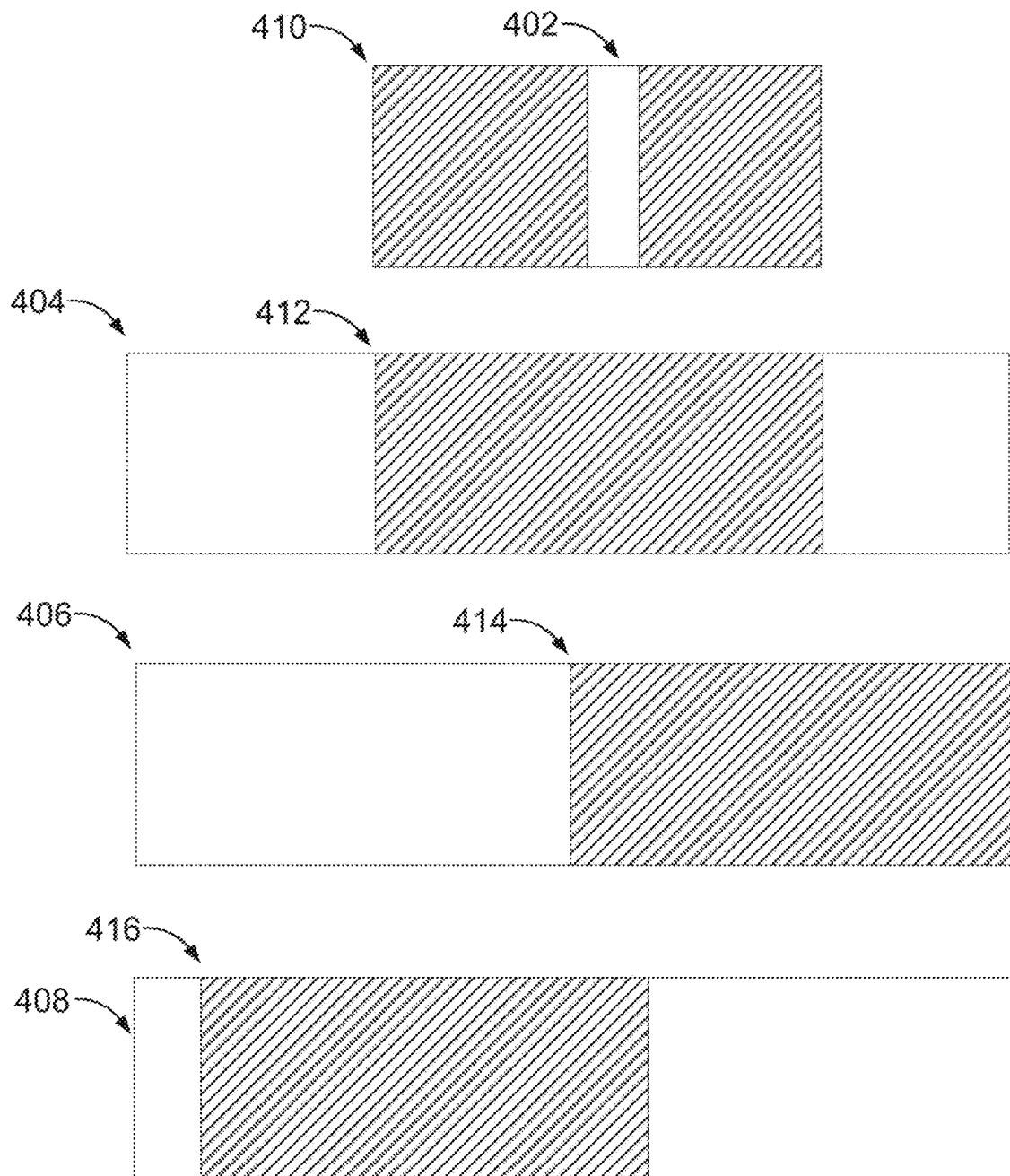
FIG. 4 shows illustrative timelines of content items containing altered and unaltered content, in accordance with some embodiments of the present disclosure.

FIG. 4 illustrates portions of altered and unaltered content within timelines of content items. For example, a first content item contains mostly original content (e.g., original content 410). However, a portion (e.g., portion 402) within the content item taking up a small percentage (e.g., ten percent) of the timeline has been modified. The system may generate a hash value corresponding to the modified portion. This may allow the system to differentiate between the specific portion that has been modified and the portion that matches the original content. The system may additionally assign a low veracity score (e.g., 25%) to the content item, indicating that it has been modified in a deceptive manner.

In another example, a second content item may contain a larger amount of altered content. The system may determine that a middle portion (e.g., portion 412) of a content item is unaltered while the beginning and ending portions have been modified. The system may further determine that the beginning and ending modified portions each comprise a larger percentage (e.g., thirty and twenty percent, respectively) of the content item, leaving fifty percent in the middle of the content item unmodified. The system may therefore determine that the beginning and ending have been replaced with alternative content. The system may determine that such a replacement likely would not deceive the user as to the meaning of the original content that remains. This may lead the system to assign a veracity score that falls within a middle range (e.g., forty to sixty percent) to the media content item.

In another example, a content item may contain a split of modified and unmodified content. For example, the first half of a content item (e.g., portion 406) may be modified while the second half of a content item (e.g., portion 414) may match the original. In this example, the content item contains the same amount of modified content (e.g., portion 406) as the previous example. However, the positioning of the modified content (e.g., all at the beginning) indicates that the modification is less likely to be deceptive. Therefore, the system may assign a higher veracity score (e.g., seventy percent) to the content item.

In another example, a content item may contain a modified portion (e.g., portion 408) at the beginning and at the end of the content timeline. In this example, as in previous examples, the modified and unmodified portions each comprise half of the total content item. However, unlike modified portion 404, modified portion 408 contains only a small portion (e.g., fifteen percent) before the unmodified content and a larger portion (e.g., thirty-five percent) after the unmodified portion. The presence of a small modified portion at the beginning of the media content item may indicate that there is simply an alternative beginning to the media content or that the portion has been modified in a deceptive manner. Therefore, the system may assign a veracity score in the middle-lower range (e.g., forty percent).

Figure 5:
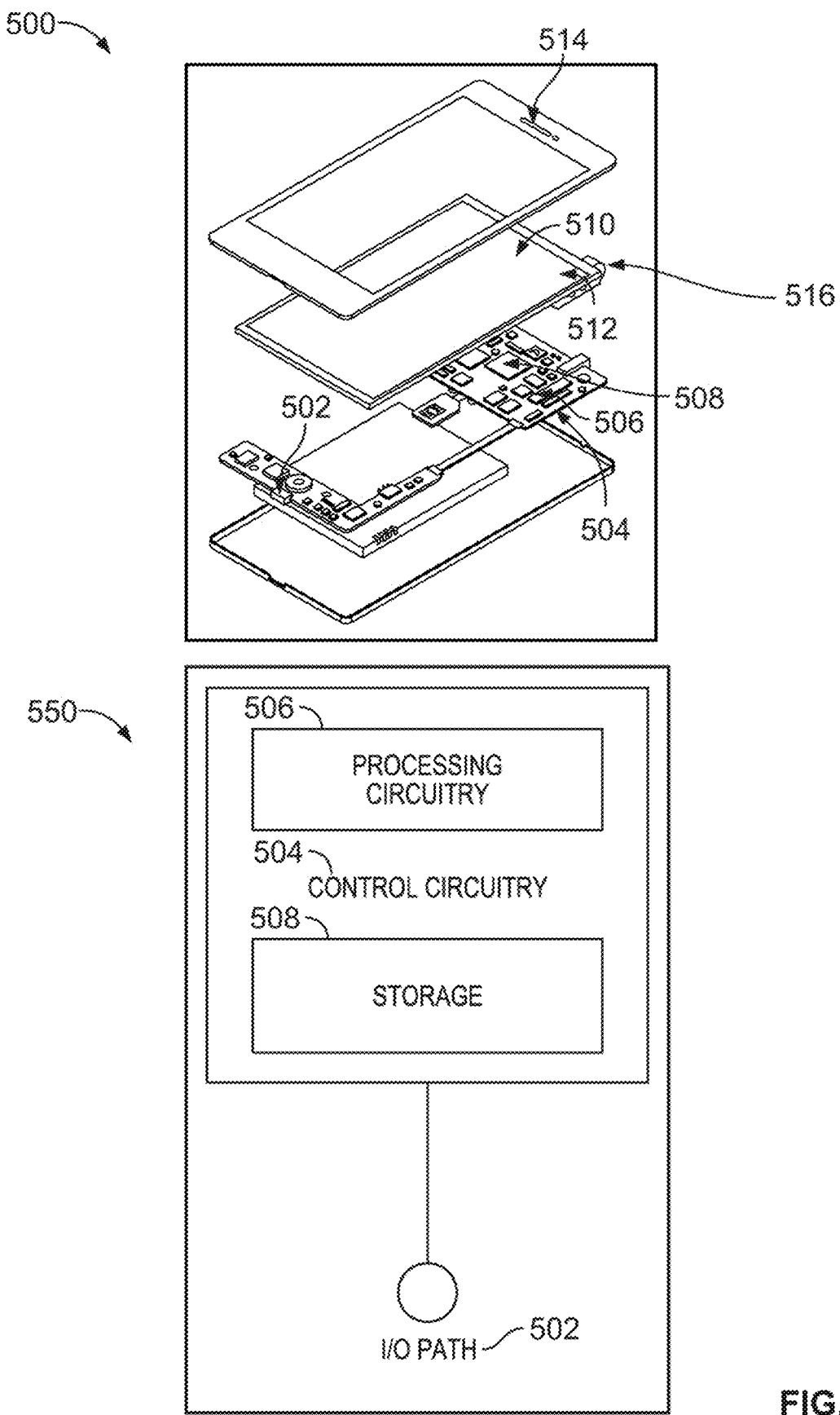
FIG. 5 is a block diagram of an illustrative user equipment, in accordance with some embodiments of the present disclosure.

FIG. 5 shows generalized embodiments of illustrative user equipment device 500, which may provide search, recommendation, and discovery features discussed herein. For example, user equipment device 500 may be a smartphone device or a remote control. In another example, user equipment system 550 may be a user television equipment system. In such cases, the devices may store a semantic graph in their memory and/or access a semantic graph in order to process a request. User television equipment system 550 may include a set-top box 516. Set-top box 516 may be communicatively connected to speaker 514 and display 512. In some embodiments, display 512 may be a television display or a computer display. In some embodiments, set-top box 516 may be communicatively connected to user interface input 510. In some embodiments, user interface input 510 may be a remote control device. Set-top box 516 may include one or more circuit boards. In some embodiments, the circuit boards may include processing circuitry, control circuitry, and storage (e.g., RAM, ROM, Hard Disk, Removable Disk, etc.). In some embodiments, circuit boards may include an input/output path. More specific implementations of user equipment devices are discussed below in connection with FIG. 6. Each one of user equipment device 500 and user equipment system 550 may receive content and data via input/output (hereinafter I/O) path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for an application stored in memory (e.g., storage 508). Specifically, control circuitry 504 may be instructed by the application to perform the functions discussed above and below. For example, the application may provide instructions to control circuitry 504 to generate the media guidance displays. In some implementations, any action performed by control circuitry 504 may be based on instructions received from the application.

In client/server-based embodiments, control circuitry 504 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508, which is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PiP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment system 550. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of each one of user equipment device 500 and user equipment system 550 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly implemented on each one of user equipment device 500 and user equipment system 550. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the application is a client/server-based application. Data for use by a thick or thin client implemented on each one of user equipment device 500 and user equipment system 550 is retrieved on-demand by issuing requests to a server remote to each one of user equipment device 500 and user equipment system 550. In one example of a client/server-based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the application is downloaded and interpreted or otherwise run by an interpreter or virtual machine (e.g., run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
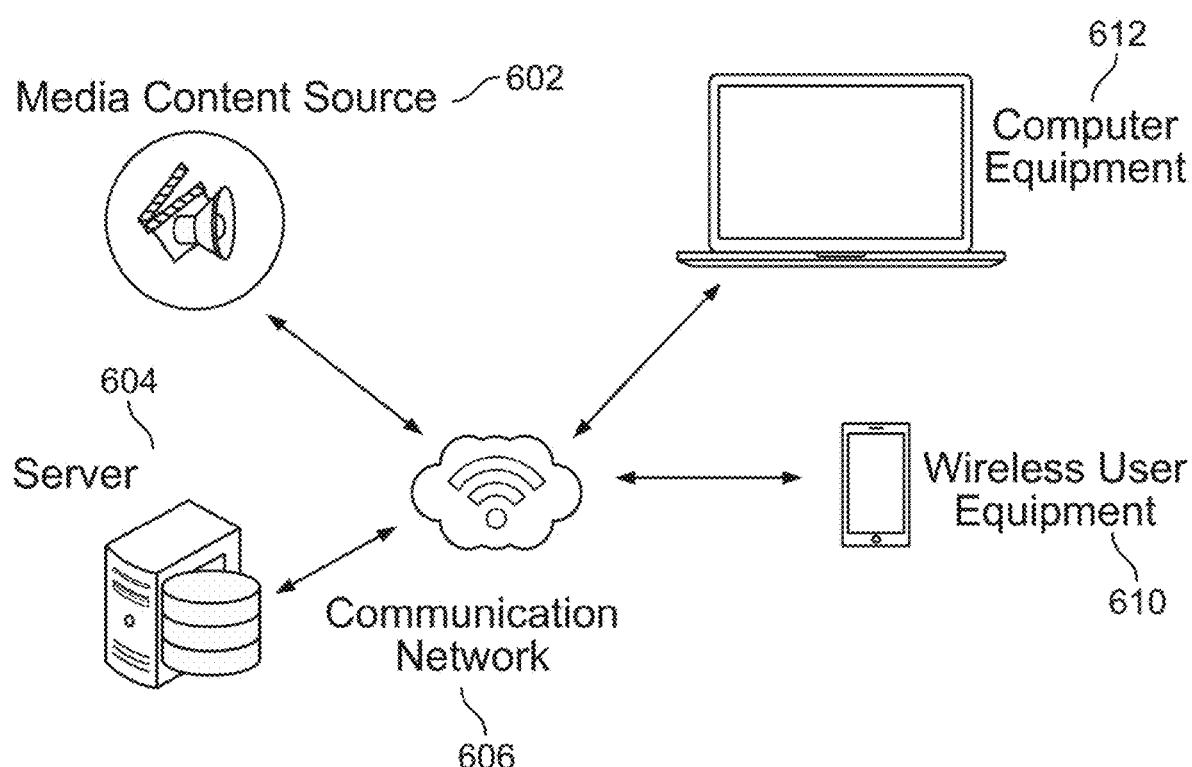
FIG. 6 is a block diagram of an illustrative media system, in accordance with some embodiments of the disclosure.

Each one of user equipment device 500 and user equipment system 550 of FIG. 5 can be implemented in system 600 of FIG. 6 as wireless user equipment 610 or computer equipment 612, or any other type of user equipment suitable for accessing content, such as a non-portable gaming machine. For simplicity, these devices may be referred to herein collectively as user equipment or user equipment devices and may be substantially similar to user equipment devices described above. User equipment devices, on which an application may be implemented, may function as a stand-alone device or may be part of a network of devices. Various network configurations of devices may be implemented and are discussed in more detail below.

A user equipment device utilizing at least some of the system features described above in connection with FIG. 6 may not be classified solely as wireless user equipment 610 or computer equipment 612. The application may have the same layout on various different types of user equipment or may be tailored to the display capabilities of the user equipment. For example, on computer equipment 612, the guidance application may be provided as a website accessed by a web browser. In another example, the guidance application may be scaled down for wireless user equipment 610.

In system 600, there are typically more than one of each type of user equipment device, but only one of each is shown in FIG. 6 to avoid overcomplicating the drawing. In addition, each user may utilize more than one type of user equipment device and also more than one of each type of user equipment device.

In some embodiments, a user equipment device (e.g., user computer equipment 612 or wireless user communications device 610) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www-.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or different types of user equipment devices. In addition, the changes made may be based on settings input by a user, as well as user activity monitored by the guidance application.

The user equipment devices may be coupled to communications network 606. Communications network 606 may be one or more networks including the Internet, a mobile phone network, mobile voice or data network (e.g., a 4G or LTE network), cable network, public switched telephone network, or other types of communications network or combinations of communications networks. Communications with the user equipment devices may be provided by one or more of these communications paths but are shown as a single path to and from each device in FIG. 6 to avoid overcomplicating the drawing.

System 600 includes a server 604. Server 604 may be a cloud-based network, which includes a plurality of servers and devices for content delivery. For example, a content delivery network (CDN) may have edge servers store (cache) content in strategic locations in order to take the load off of one or more origin servers. By moving static assets like images, HTML and JavaScript files (and potentially other content) as close as possible to the requesting client machine, an edge server cache is able to reduce the amount of time it takes for a web resource to load. In addition, there may be more than one content source 602, but only one is shown in FIG. 6 to avoid overcomplicating the drawing. (The different types of each of these sources are discussed below.)

Content source 602 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 602 may be the originator of content (e.g., a television broadcaster, a Webcast provider, etc.) or may not be the originator of content (e.g., an on-demand content provider, an Internet provider of content of broadcast programs for downloading, etc.). Content source 602 may include cable sources, satellite providers, on-demand providers, Internet providers, over-the-top content providers, or other providers of content. Content source 602 may also include a remote media server used to store different types of content (including video content selected by a user), in a location remote from any of the user equipment devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Figure 7:
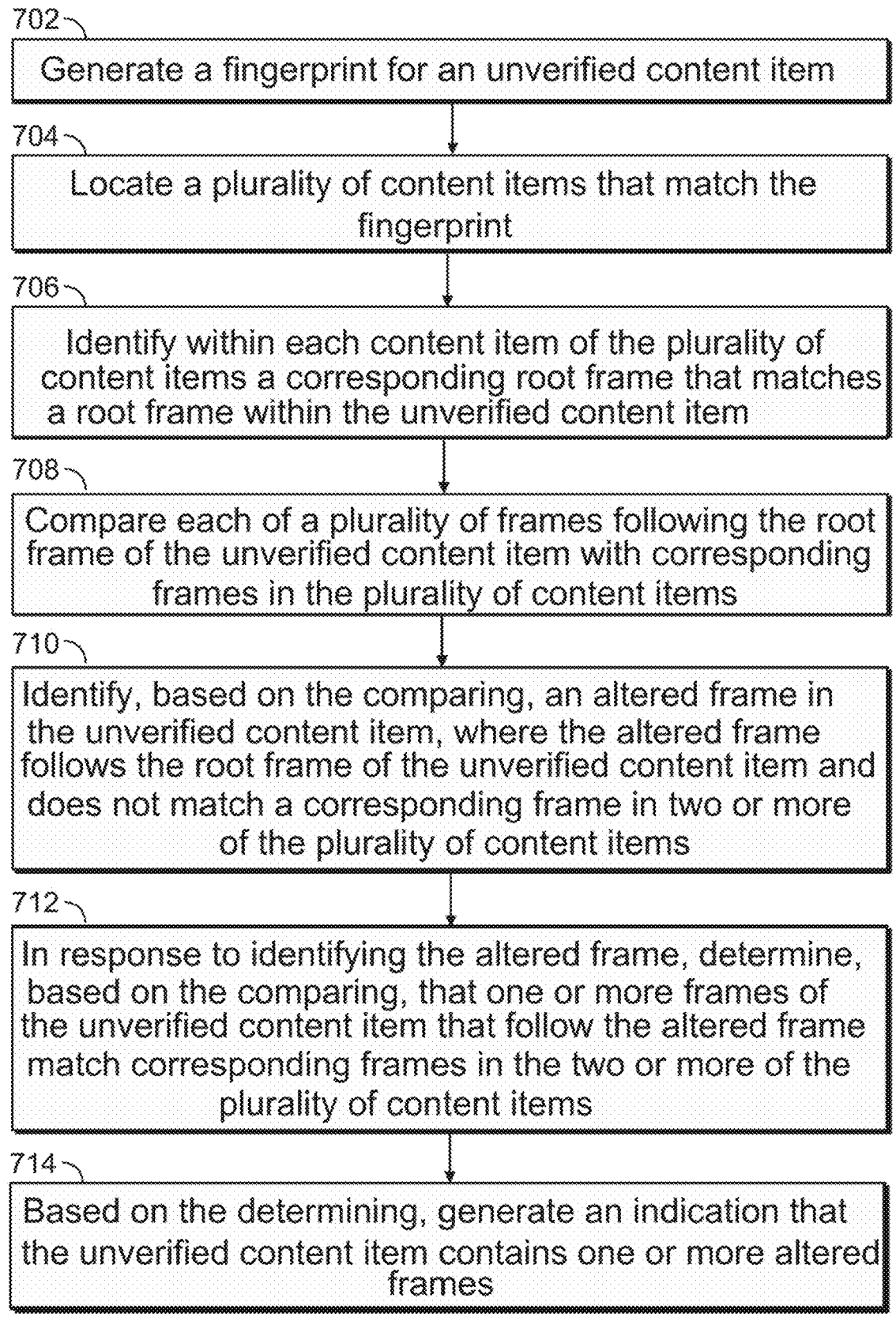
FIG. 7 is a flowchart of an illustrative process for detecting altered content in a content item, in accordance with some embodiments of the present disclosure.

FIG. 7 is an illustrative process for detecting altered content in a content item. As shown in FIG. 7, the system compares frames of unverified content items with corresponding frames from matching content items. If the system detects altered content within the frames, the system alerts the user that the content item contains altered frames.

At step 702, the system (e.g., via control circuitry 504) generates a fingerprint for an unverified content item. A fingerprint may be a collection of metadata that is unique to a particular file or content item. The fingerprint may contain text strings, identifying information, links to external databases (e.g., media content source 602), information connecting the fingerprint to other fingerprints, and other data. In one example, the system may pass a bitstream corresponding to the unverified content item to a hash function to obtain a hash of the data. In another example, the system may locate a sub-portion of images in frames of the media content and use those to build a fingerprint of the media content. In some embodiments, the system may generate the fingerprint by extracting data representing a plurality of intra-coded picture frames from the unverified content item. The system may then map the data representing the plurality of intra-coded picture frames to a unique identifier. In some embodiments, the fingerprint may be transferred in connection with a content item or may be generated by the system when the content item is received or located. The fingerprint may be used to identify related content items.

At step 704, the system locates a plurality of content items that match the fingerprint. For example, the system (e.g., via control circuitry 504) may search a database of content items (e.g., media content source 602) for any content items with a matching fingerprint. In some embodiments, the system may identify a matching fingerprint by comparing text strings of identifying information stored in the fingerprint. Additionally or alternatively, the system may utilize a web crawler to find content items with a matching fingerprint. In some embodiments, the system may receive a plurality of matching content items via I/O path 502. The system may receive some content items in the form of compressed data streams. In this case, the system may decompress the data streams before proceeding with the process. Once the system has identified a plurality of content items with matching fingerprints, the system may apply conversions to the plurality of content items in order to normalize the content items. For example, the system may scale and crop the plurality of content items and the unverified content item to the same shape and dimensions. In some embodiments, the system may identify that the first unverified content item has been inserted into another content item as a picture-in-picture (PiP) inset. The system may determine that frames from the PiP inset should be used for comparison. The system may therefore crop the content item down to just the PiP inset. The system may additionally or alternatively normalize the quality of the content items so that each content item has the same resolution.

At step 706, the system (e.g., via control circuitry 504) identifies within each content item of the plurality of content items a corresponding root frame that matches a root frame within the unverified content item. The system may select as a root frame the first frame of the unverified content item. The system may then iterate through each frame of a first content item of the plurality of content items until a frame within the first content item matches the first content item of the unverified content item. The system may use a number of image comparison techniques for this process. The system may then set the frame within the first content item that matches the first frame as a root frame for the first content item. In some embodiments, the system may select as a root frame the first frame of a portion of the unverified content item that has been flagged as potentially altered. The system may then scan through each content item of the plurality of content items in order to find corresponding root frames. The system may additionally align each content item such that the root frames of all the content items are aligned.

In some embodiments, step 706 comprises a comparison between audio profiles, pixels in an image, or other characteristics of a content item. For example, the system (e.g., via control circuitry 504) selects an audio pattern and/or profile shape as the root of the audio profile. The system may select a certain series of notes in an audio clip, corresponding to a specific profile shape, as the root. The profile shape may be any segment of the audio profile (e.g., as depicted in FIG. 3). The system may use the specific shape of the audio profile, along with the pattern of corresponding notes, pitch, and other characteristics to align the root segments of the audio clips.

At step 708, the system compares each of a plurality of frames following the root frame of the unverified content item with corresponding frames in the plurality of content items. In some embodiments, the system may select a first content item from the plurality of content items. The system may then retrieve (e.g., via control circuitry 504) a first identifier associated with a frame sequentially following the root frame of the unverified content item and a second identifier associated with a corresponding frame sequentially following the root frame of the first content item. The system may retrieve the identifiers from the metadata of the content items (e.g., using control circuitry 504). In some embodiments, the system may retrieve the identifiers from storage (e.g., storage 508). In some embodiments, the system may receive the identifiers via I/O path 502. The system may then retrieve, using the first identifier, a first frame of the unverified content item, and using the second identifier, a second frame of the first content item. The system may then determine whether the first frame matches the second frame.

In some embodiments, comparing each of the plurality of frames following the root frame of the unverified content item with corresponding frames in the plurality of content items may comprise extracting image data from the each of the plurality of frames following the root frame of the unverified content item and corresponding frames in the plurality of content items. The system may then determine the extent to which pixel data in the image data differs between the plurality of frames following the root frame of the unverified content item and corresponding frames in the plurality of content items. For example, the system performs keypoint matching to compare the frames in this stem. Keypoint matching may comprise comparing a certain number of points across frames to determine if there is a match. The system may select points that are integral to the frames, such as corners, edges, and points in the frame that align with important objects. In some embodiments, the system may compare RBG values of pixels to determine if the keypoints match. Additionally or alternatively, the system may use a histogram method for image comparison. For this method, the system may compute color and texture histograms. The system may employ a number of processes as part of the histogram comparison including edge detection, scaling, color comparisons, and other processes. Additionally or alternatively, the system may utilize other image comparison techniques to compare the frames of content items.

In some embodiments, step 708 compares an audio profile following the root portion with corresponding audio profiles. In some embodiments, comparing each of the plurality of frames following the root frame of the unverified content item with corresponding frames in the plurality of content items comprises extracting audio data from the each of the plurality of frames following the root frame of the unverified content item and corresponding frames in the plurality of content items. The system may then determine the extent to which audio data differs between the plurality of frames following the root frame of the unverified content item and corresponding frames in the plurality of content items. For example, the system (e.g., using control circuitry 504) may compare the shape of the profile, the strength of the volume at each given time, lyrics identified in the metadata, and any other identifying factors for each audio clip. The system may scale the profiles to the same strength, volume, style, or other factor before performing the comparison. In some embodiments, comparing each of the plurality of frames following the root frame of the unverified content item with corresponding frames in the plurality of content items comprises extracting audio data from the each of the plurality of frames following the root frame of the unverified content item and corresponding frames in the plurality of content items. The system may then determine the extent to which audio data differs between the plurality of frames following the root frame of the unverified content item and corresponding frames in the plurality of content items.

At step 710, the system identifies, based on the comparing, an altered frame or portion in the unverified content item, where the altered frame follows the root frame of the unverified content item and does not match a corresponding frame in two or more of the plurality of content items. In some embodiments, the system may determine that the first frame and the second frame do not correspond to the same frame. For example, the system (e.g., via control circuitry 504) may identify during a keypoint matching process that a point or a cluster of points do not match the corresponding frame in two or more of the plurality of content items. This may indicate that an object in the frame has been added, removed, distorted, or modified in some other way. In another example, the system may identify during a histogram comparison that one or more of a color and texture histogram in the unverified content item frame does not match a corresponding frame in two or more of the plurality of content items. This system may additionally or alternatively identify an altered frame through a variety of other processes. Based on determining that the first frame and the second frame do not correspond to the same frame, the system may then select a second content item from the plurality of content items. The system may then retrieve a third identifier associated with a frame sequentially following the root frame of the second content item. The system may retrieve the third identifier using control circuitry 504. The system may then retrieve, using the third identifier, a third frame from the second content item (e.g., using control circuitry 504). The system may then determine that the third frame matches the second frame and does not match the first frame. The system may use any image comparison technique to perform this step (e.g., via control circuitry 504). Based on determining that the third frame matches the second frame and does not match the first frame, the system may identify the first frame as an altered frame. The system may store an identifier of the altered frame in the metadata of the content item or in local storage (e.g., storage 508) using control circuitry 504.

At step 712, in response to identifying the altered frame, the system determines, based on the comparing, that one or more frames of the unverified content items that follow the altered frame match corresponding frames in the two or more of the plurality of content items. The system may perform image comparison techniques such as keypoint matching, histogram comparisons, or any other suitable method.

At step 714, based on the determining, the system generates an indication that the unverified content item contains one or more altered frames. The indication may be based on the number of altered frames. For example, the system (e.g., via control circuitry 504) may generate an indication of the number of frames that have been altered. In another example, the system may generate an indication of the percentage of frames that have been altered. In another example, the system may generate an indicator that expresses to the user the quality of video based on the altered frames. For example, the system generates a label such as "authentic," "inauthentic," "good," "bad," "high," "low," or another label to indicate the veracity of the content item. The system may display this label along with the content item (e.g., on display 512). Additionally or alternatively, the system may use a color code to indicate alterations. For example, the system may use red to indicate that frames in a content item are altered while green indicates that no frames in the content item have been altered. The system may store this indication in the metadata of the content item or in local storage (e.g., storage 508).

Figure 8:
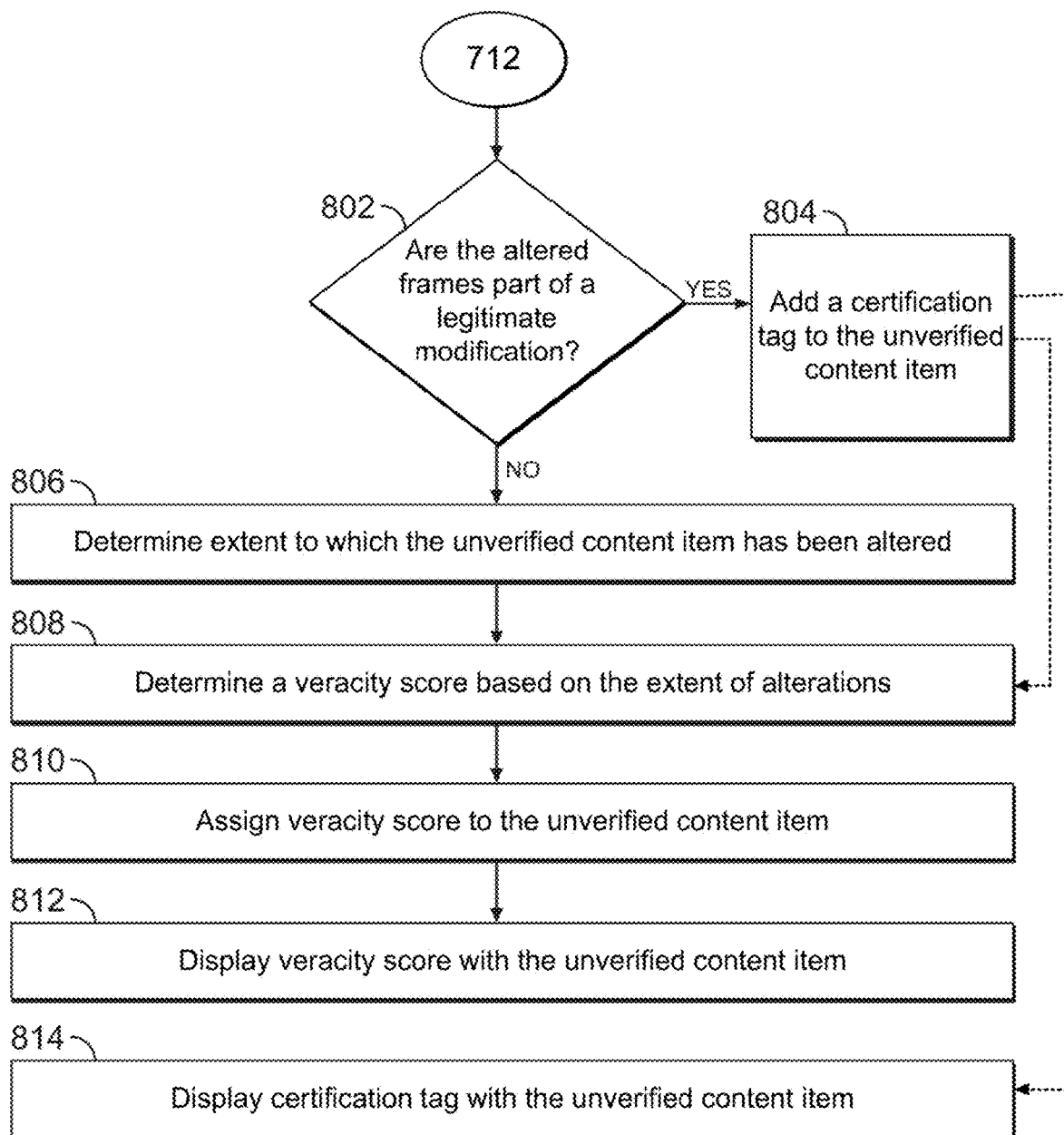
FIG. 8 is a flowchart of an illustrative process for adding certification tags or veracity scores to unverified content items, in accordance with some embodiments of the present disclosure.

Process 700 continues with step 802 in FIG. 8. In step 802, the system (e.g., via control circuitry 504) determines whether the altered frames are part of a legitimate modification. For example, the modifications may be alterations to match the frames with a language translation, to highlight a portion of importance in the content item, to add content for clarification, or to make another legitimate modification. The system may determine legitimacy by checking the source of the content item, (e.g., control circuitry 504 may scan the metadata for the source of the content item). Based on the source and the type of modification, the system may determine that the modification is legitimate. For example, there may be a modification comprising a number of added frames in the form of a highlight reel. If the system determines that the altered frames are part of a legitimate modification, the system continues at step 804. If the system determines that the altered frames are not part of a legitimate modification, the system continues at step 806.

In some embodiments, the system may identify that the unverified content item is a different video or audio quality from the plurality of content items. For example, the unverified content item is a user-uploaded video, and the plurality of content items are in high definition. The system may determine that visual or audio quality differences are a legitimate modification, as the substance of the content is not altered. The system may then proceed to step 804 if there are no illegitimate modifications.

At step 804, the system adds a certification tag to the unverified content item. For example, the system (e.g., control circuitry 504) may embed the certification tag in the metadata of the content item. The certification tag may be an indication that the content has been altered but that the alterations are legitimate. The certification may further comprise a symbol. In some embodiments, the system may continue to step 808 to determine a veracity score based on the extent of the alterations. In some embodiments, the system may continue to step 814 to display the certification tag with the unverified content item.

At step 806, the system determines the extent to which the unverified content item has been altered. The system may determine a percentage of frames or a number of frames of the content item that have been altered. The system may additionally or alternatively determine the type of modification (e.g., addition of frames, deletion of frames, modification of frames, repeated frames, etc.).

At step 808, the system determines a veracity score based on the extent of alterations. For example, the system (e.g., via control circuitry 504) may implement an algorithm which accounts for the percentage or number of altered frames, the type of modification, the type of content, the source of the content item, and a number of other factors. In some embodiments, the system may use an algorithm such as the algorithm depicted in FIG. 11. The veracity score may be a number or percentage that reflects the accuracy of the content, a score on a rating system (e.g., a rating out of one hundred), a score on a color scale (e.g., red, yellow, or green), or another indicator of the score. Additionally or alternatively, the system may determine a different veracity score for portions of the unverified content item. For example, the system may identify that the majority of an unverified content item contains no altered frames and may therefore determine a high veracity score for the majority of the video. The system may then identify a portion containing altered frames and may determine a lower veracity score for that portion.

At step 810, the system may assign the veracity score to the unverified content item or to portions of the unverified content item. The system (e.g., using control circuitry 504) may embed the veracity within the metadata of the unverified content item.

At step 812, the system may display the veracity score with the unverified content item (e.g., via display 512). For example, the system displays the veracity score at the beginning of the display of the unverified content item. Additionally or alternatively, the system may display the veracity score next to the content item in a listing of a plurality of content items. Additionally or alternatively, the system may display the veracity score simultaneously with the content item (e.g., overlayed on a portion of the content item). In some embodiments, the system may play back only portions of the unverified content item for which the veracity score is above a threshold. In some embodiments, the system may display a quick-access option to play back portions of the unverified content item for which the veracity score is above a threshold. For example, the system may add bookmarks or visual indicators to portions of the unverified content item for which the veracity score is above a threshold. In response to a user selection of a bookmark or indicator, the system may then play back the selected portions.

At step 814, the system displays the certification tag with the unverified content item (e.g., via display 512). In some embodiments, the system may display the certification tag at the beginning of the display of the unverified content item. Additionally or alternatively, the system may display the certification tag next to the content item in a listing of a plurality of content items. Additionally or alternatively, the system may display the certification tag simultaneously with the content item (e.g., overlayed on a portion of the content item).

Figure 9:
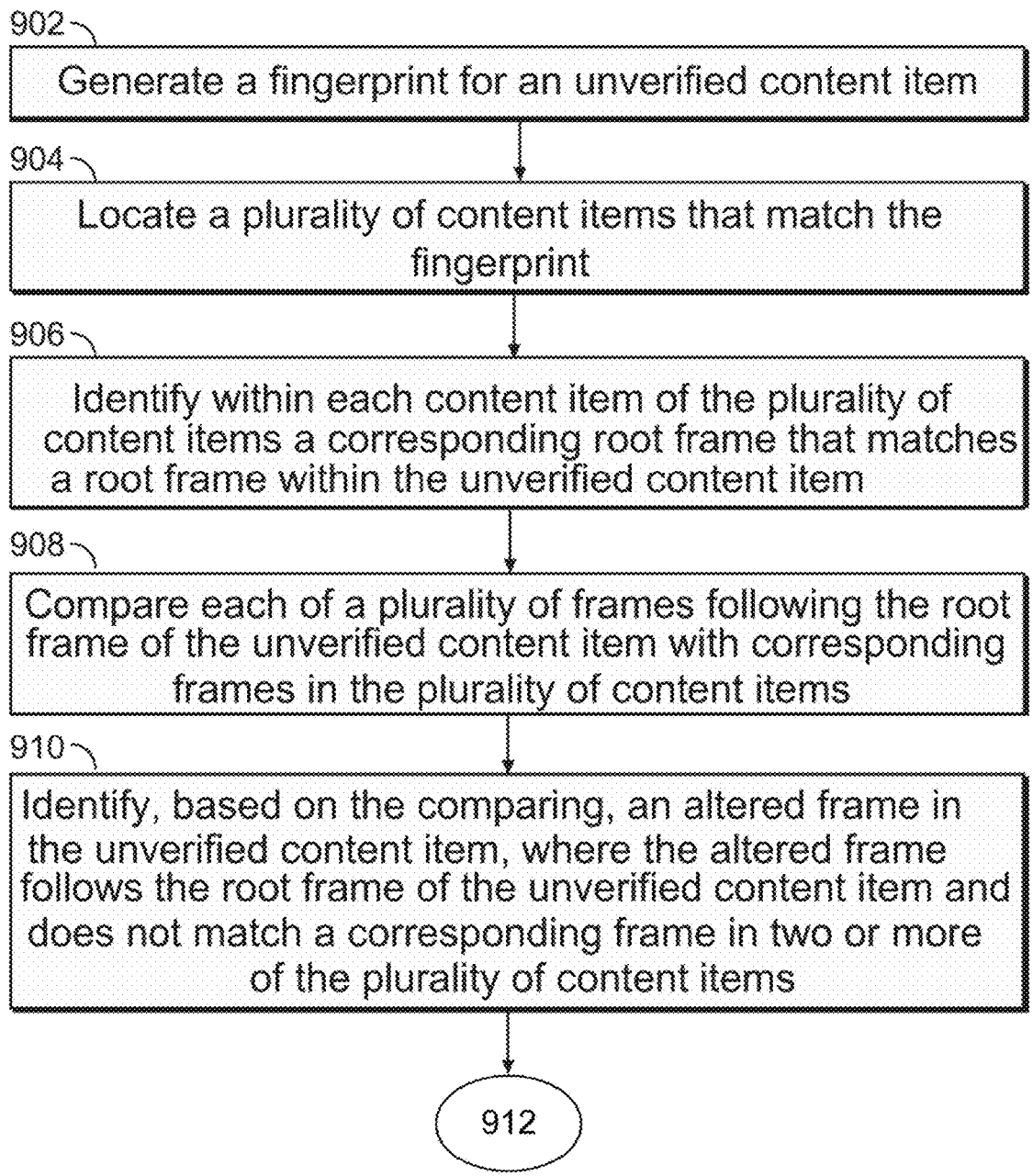
FIG. 9 is a flowchart of an illustrative process for generating a risk factor for modified content, in accordance with some embodiments of the present disclosure.
Figure 9:
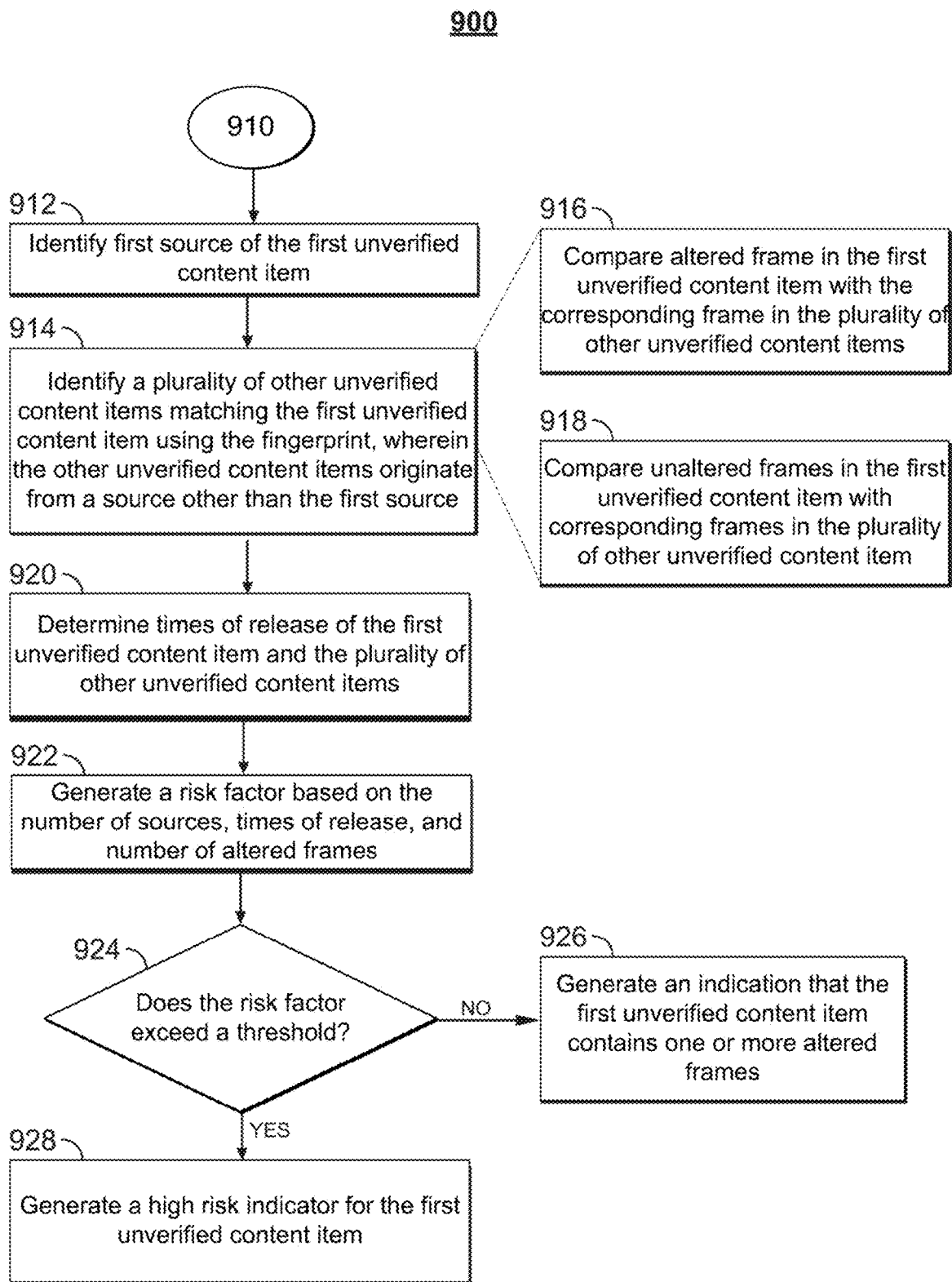

FIG. 9 depicts an illustrative process for generating a risk factor for modified content. At step 902, the system (e.g., control circuitry 504) generates a fingerprint for a first unverified content item. A fingerprint may be a collection of metadata that is unique to a particular file or content item. The fingerprint may contain text strings, identifying information, links to external databases (e.g., media content source 602), information connecting the fingerprint to other fingerprints, and other data. In one example, the system may pass a bitstream corresponding to the unverified content item to a hash function to obtain a hash of the data. In another example, the system may locate a sub-portion of images in frames of the media content and use those to build a fingerprint of the media content. In some embodiments, the system may generate the fingerprint by extracting data representing a plurality of intra-coded picture frames from the unverified content item. The system may then map the data representing the plurality of intra-coded picture frames to a unique identifier. The fingerprint may be transferred in connection with a content item or may be generated by the system when the content item is received or located. The fingerprint may further be used to identify related content items.

At step 904, the system locates a plurality of content items that match the fingerprint. For example, the system (e.g., via control circuitry 504) may search a database of content items (e.g., media content source 602) for any content items with a matching fingerprint. In some embodiments, the system may identify a matching fingerprint by comparing text strings of identifying information stored in the fingerprint. Additionally or alternatively, the system may utilize a web crawler to find content items with a matching fingerprint. In some embodiments, the system may receive a plurality of matching content items via I/O path 502. The system may receive some content items in the form of compressed data streams. In this case, the system may decompress the data streams before proceeding with the process. Once the system has identified a plurality of content items with matching fingerprints, the system may apply conversions to the plurality of content items in order to normalize the content items. For example, the system may scale and crop the plurality of content items and the first unverified content item to the same shape and dimensions. In some embodiments, the system may identify that the first unverified content item has been inserted into another content item as a picture-in-picture (PiP) inset. The system may determine that frames from the PiP inset should be used for comparison. The system may therefore crop the content item down to just the PiP inset. The system may additionally or alternatively normalize the quality of the content items so that each content items has the same resolution.

At step 906, the system (e.g., via control circuitry 504) identifies within each content item of the plurality of content items a corresponding root frame that matches a root frame within the first unverified content item. The system may select as a root frame the first frame of the first unverified content item. Alternatively, the system may select as a root frame the first frame of a portion of the first unverified content item that has been flagged as potentially altered. The system may then scan through each content item of the plurality of content items in order to find corresponding root frames. The system may additionally align each content item such that the root frames of all the content items are aligned.

In some embodiments, step 906 comprises a comparison between audio profiles, pixels in an image, or other characteristics of a content item. For example, the system (e.g., via control circuitry 504) may select an audio pattern and/or profile shape as the root of the audio profile. For example, the system selects a certain series of notes in an audio clip, corresponding to a specific profile shape, as the root. The profile shape may be any segment of the audio profile (e.g., as depicted in FIG. 3). The system may use the specific shape of the audio profile, along with the pattern of corresponding notes, pitch, and other characteristics to align the root segments of the audio clips.

At step 908, the system compares each of a plurality of frames following the root frame of the first unverified content item with corresponding frames in the plurality of content items. In some embodiments, comparing each of the plurality of frames following the root frame of the unverified content item with corresponding frames in the plurality of content items may comprise extracting image data from the each of the plurality of frames following the root frame of the unverified content item and corresponding frames in the plurality of content items. The system may then determine the extent to which pixel data in the image data differs between the plurality of frames following the root frame of the unverified content item and corresponding frames in the plurality of content items. For example, the system (e.g., via control circuitry 504) may perform keypoint matching to compare the frames. Keypoint matching may comprise comparing a certain number of points across frames to determine if there is a match. The system may select points that are integral to the frames, such as corners, edges, and points in the frame that align with important objects. In some embodiments, the system may compare RBG values of pixels to determine if the keypoints match. Additionally or alternatively, the system may use a histogram method for image comparison. For this method, the system may compute color and texture histograms. The system may employ a number of processes as part of the histogram comparison including edge detection, scaling, color comparisons, and other processes. Additionally or alternatively, the system may utilize other image comparison techniques to compare the frames of content items.

In some embodiments, step 908 compares an audio profile following the root portion with corresponding audio profiles. In some embodiments, comparing each of the plurality of frames following the root frame of the unverified content item with corresponding frames in the plurality of content items comprises extracting audio data from the each of the plurality of frames following the root frame of the unverified content item and corresponding frames in the plurality of content items. The system may then determine the extent to which audio data differs between the plurality of frames following the root frame of the unverified content item and corresponding frames in the plurality of content items. For example, the system (e.g., using control circuitry 504) may compare the shape of the profile, the strength of the volume at each given time, lyrics identified in the metadata, and any other identifying factors for each audio clip. The system may scale the profiles to the same strength, volume, style, or other factor before performing the comparison.

At step 910, the system identifies, based on the comparing, an altered frame or portion in the first unverified content item, where the altered frame follows the root frame of the first unverified content item and does not match a corresponding frame in two or more of the plurality of content items. For example, the system (e.g., via control circuitry 504) may identify during a keypoint matching process that a point or a cluster of points do not match the corresponding frame in two or more of the plurality of content items. This may indicate that an object in the frame has been added, removed, distorted, or modified in some other way. In another example, the system may identify during a histogram comparison that one or more of a color and texture histogram in the first unverified content item frame does not match a corresponding frame in two or more of the plurality of content items. This system may additionally or alternatively identify an altered frame through a variety of other processes.

At step 912, the system identifies a first source of the first unverified content item. In some embodiments, the system may identify (e.g., using control circuitry 504) a source that is stored in the metadata of the first unverified content item. In some embodiments, the system may identify the source based on the location from which the system previously retrieved the content item. For example, the system may have stored a location in a database (e.g., content source 602), a website, or another location from which the system retrieved the content item in local storage (e.g., storage 508). Additionally or alternatively, the system may receive the source via I/O path 502.

At step 914, the system identifies a plurality of other unverified content items matching the first unverified content item using the fingerprint, wherein the other unverified content items originate from a source other than the first source. For example, the system (e.g., via control circuitry 504) may search a database of content items (e.g., media content source 602) for any content items with a matching fingerprint. Additionally or alternatively, the system may utilize a web crawler to find content items with a matching fingerprint. In some embodiments, the system may identify a matching fingerprint by comparing text strings of identifying information stored in the fingerprint.

Step 916 depicts an embodiment for completing step 914. At step 916, the system (e.g., via control circuitry 504) compares altered frames in the first unverified content item with the corresponding frames in the plurality of other unverified content items. For example, the system performs keypoint matching to compare the frames. Keypoint matching may comprise comparing a certain number of points across frames to determine if there is a match. The system may select points that are integral to the frames, such as corners, edges, and points in the frame that align with important objects. Additionally or alternatively, the system may use a histogram method for image comparison. For this method, the system may compute color and texture histograms. The system may employ a number of processes as part of the histogram comparison including edge detection, scaling, color comparisons, and other processes.

Step 918 depicts another embodiment for completing step 916. At step 918, the system (e.g., via control circuitry 504) compares unaltered frames in the first unverified content item with the corresponding frames in the plurality of other unverified content items. The system may use any image comparison techniques to compare the frames of content items, as detailed above.

At step 920, the system determines the time of release of the first unverified content item and the plurality of other unverified content items. For example, the system (e.g., using control circuitry 504) may analyze the metadata for a stored time of release. Additionally or alternatively, the system may locate the source of the content item and determine the time at which the source released the content item.

At step 922, the system determines a risk factor based on the number of sources, times of release, and number of altered frames. The system may rely on a number of additional factors, e.g., content type, clusters of altered content, percent of altered content, modification types, and veracity level. An illustrative example of how the system (e.g., control circuitry 504) may use these factors to calculate risk factor is discussed below in depth in relation to FIG. 11.

At step 924, the system determines whether the risk factor exceeds a threshold. In some embodiments, the threshold for the risk factor may be a percent against which each unverified content item is compared. In some embodiments, the threshold may be determined based on a user input. For example, the user may input (e.g., via wireless user equipment 610 or computer equipment 612) a level of risk that is acceptable. In some embodiments, the system may prompt the user to input a level of risk on a certain scale (e.g., low, medium, or high). The system may then convert the level of risk into a risk-factor threshold. In some embodiments, the threshold may be determined by the system based on a number of factors. For example, the system determines the average risk factor across all unverified content items in the system. Based on this average, the system may calculate a threshold to include only the top percent of the content items (e.g., top five percent, top ten percent, top thirty percent, etc.). In some embodiments, the system may determine a threshold based on historic data. For example, the system gathers data on previous content items that were discredited due to modifications. The system may then determine an average level of risk that is acceptable based on the historic data of modified content. The system may then set the threshold based on this level of risk. If the risk factor does not exceed the threshold, the system proceeds to step 926. If the risk factor does exceed the threshold, the system proceeds to step 928.

At step 926, the system generates an indication that the first unverified content item contains one or more altered frames. The indication may be based on the number of altered frames. For example, the system generates an indication of the number of frames that have been altered. In another example, the system may generate an indication of the percentage of frames that have been altered. In another example, the system may generate an indicator that expresses to the user the quality of video based on the altered frames. For example, the system generates a label such as "authentic," "inauthentic," "good," "bad," "high," "low," or another label to indicate the veracity of the content item. The system may display this label along with the content item (e.g., on display 512). Additionally or alternatively, the system may use a color code to indicate alterations. For example, the system uses red to indicate that frames in a content item have been altered while green indicates that no frames in the content item have been altered.

At step 928, the system generates a high risk indicator for the first unverified content item. The high risk indicator may contain symbols, text, an audio sound, or another indication. The high risk indicator may be displayed or played before the content item or may be displayed or played simultaneously with the content item. The high risk indicator may require additional user input in order to be played. For example, the system (e.g., using wireless user device 610 or computer device 612) may display or play the high risk indicator at the beginning of the content item and require that the user enter a user input before the content item plays. For example, the indicator may comprise a disclaimer and may require that the user click a button (e.g., "continue" or "accept") before the content item will play.

Figure 10:
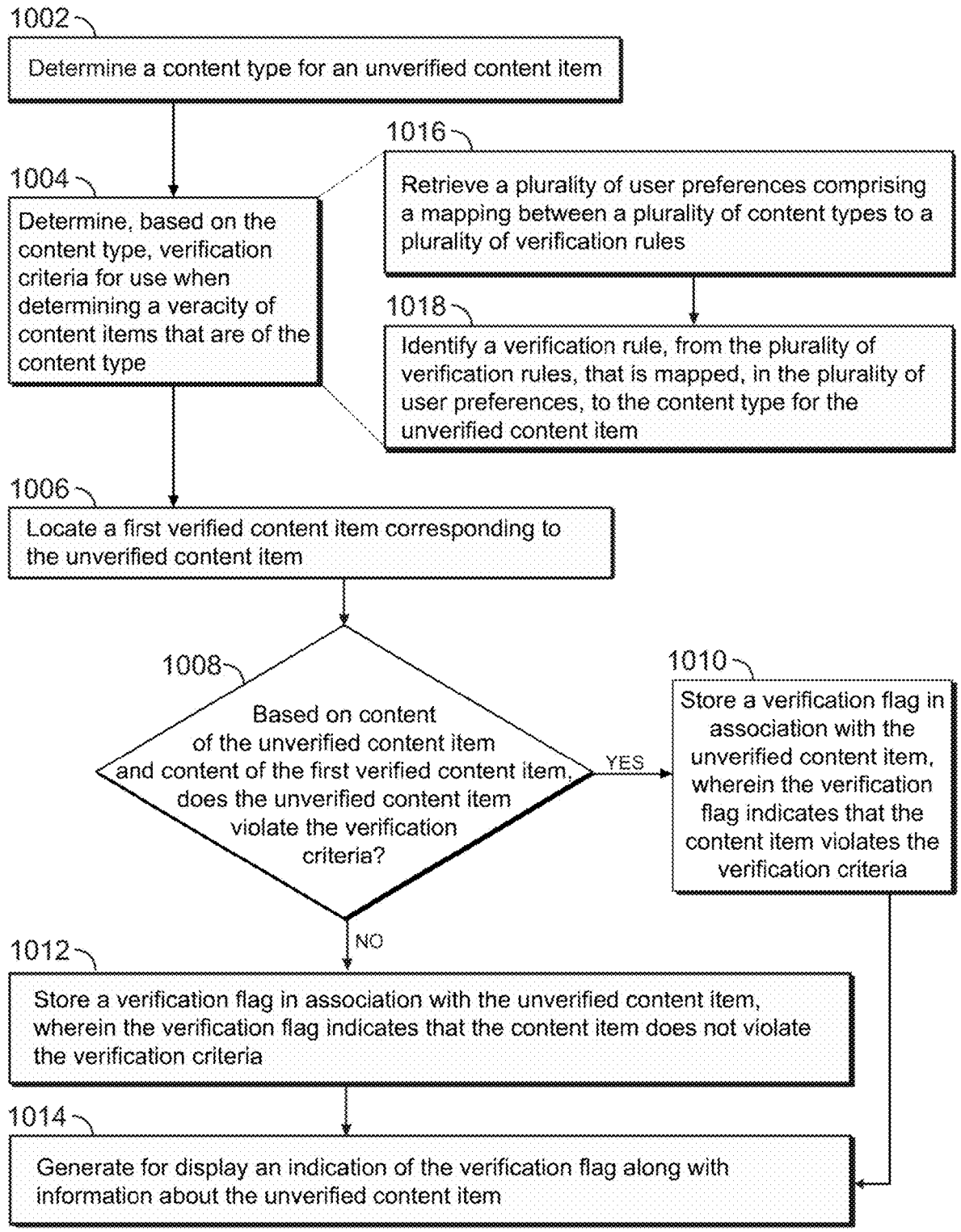
FIG. 10 is a flowchart of an illustrative process for determining the veracity of an unverified content item, in accordance with some embodiments of the present disclosure.

FIG. 10 depicts an illustrative process for determining the veracity of an unverified content item. At step 1002, the system determines a content type for an unverified content item. The content type may be a video clip, news segment, audio clip, podcast, screenshot, photograph, or another type of content. The system may determine the type by analyzing the metadata for tags or a "type" field. The system may additionally or alternatively compare the content item to a variety of reference content items in a database (e.g., media content source 602) or on the Internet. If two content items possess many of the same characteristics, the system may determine that the content items are the same content type. The system may then assign the content type of the reference content item to the unverified content item.

At step 1004, the system determines, based on the content type, verification criteria for use when determining the veracity of content items that are of the content type. In some embodiments, verification criteria comprise a plurality of rules identifying acceptable changes in audio frequency, audio speed, or audio volume between segments of audio content. For example, an audio clip may contain verification criteria specifying that no more than twenty-five percent of the clip may be modified and no segment of less than five seconds may be modified. In some embodiments, verification criteria comprise a plurality of rules identifying acceptable changes in image data between segments of video content. In some embodiments, a video clip may contain verification data that specifies that no frame may be partially modified and that no cluster of 10 or fewer frames may be modified within the clip. The system (e.g., using control circuitry 504) may save the verification criteria to local storage (e.g., storage 508) or may additionally embed the verification criteria within the metadata of the unverified content item. In some embodiments, the system may apply different verification criteria to segments that have been identified as important. For example, a segment may contain a tag marking it as important, or the system may identify that a certain portion of the content item is available from many different sources or has been shared on social media platforms by a large number of users.

In some embodiments, the system may complete step 1004 by incorporating user preferences. In step 1016, the system retrieves a plurality of user preferences comprising a mapping between a plurality of content types to a plurality of verification rules. The system (e.g., using control circuitry 504) may retrieve the user preferences using user interface input 510. Additionally or alternatively, the system may receive the user preferences via I/O path 502. The system may store the user preferences in local storage (e.g., storage 508). In some embodiments, the user preferences may specify different rules and standards for audio content, video content, image content, and so on. For example, the user may specify that video content may be deleted but not added. In another example, the user may specify that audio content may be added and deleted but not modified.

At step 1018, the system identifies a verification rule, from the plurality of verification rules, that is mapped, in the plurality of user preferences, to the content type for the unverified content item. The system (e.g., using control circuitry 504) may analyze the fingerprint of the unverified content item to determine the content type. The system may then identify verification rules that apply to the content type that describes the unverified content item. The system may collect every verification rule that applies to the content type and, in some embodiments, may store the verification rules in local storage (e.g., storage 508). The collection of verification rules that apply to the content type may collectively be used as the verification criteria for the content type.

At step 1006, the system locates a verified content item corresponding to the unverified content item. In some embodiments, the system may locate the matching verified content item by comparing fingerprints of the verified and unverified content items.

At step 1008, the system determines, based on content of the unverified content item and content of the verified content, whether the unverified content item violates the verification criteria. In some embodiments, the system may determine the number and types of modifications of the unverified content item and compare these modifications to the verification criteria. If the system determines that the unverified content item violates the verification criteria, the system proceeds to step 1010. If the system determines that the unverified content item does not violate the verification criteria, the system proceeds to step 1012.

At step 1010, in response to determining that the unverified content item violates the verification criteria, the system stores a verification flag in association with the unverified content item, wherein the verification flag indicates that the content item violates the verification criteria. The system (e.g., using control circuitry 504) may embed the verification flag within the metadata of the unverified content item. The verification flag may cause the display device (e.g., computer equipment 612 or wireless user equipment 610) to generate for display an indication that the content item violates the verification criteria (e.g., via display 512).

At step 1012, in response to determining that the unverified content item does not violate the verification criteria, the system stores a verification flag in association with the unverified content item, wherein the verification flag indicates that the content item does not violate the verification criteria. The system (e.g., using control circuitry 504) may embed the verification flag within the metadata of the unverified content item. The verification flag may cause the display device (e.g., computer equipment 612 or wireless user equipment 610) to generate for display an indication that the content item does not violate the verification criteria (e.g., via display 512).

At step 1014, the system generates for display an indication of the verification flag (e.g., on display 512) along with information about the unverified content item. The system may display the indication of the verification flag on the display device (e.g., computer equipment 612). For example, the system displays the verification flag before displaying the content item. In some embodiments the system may display the verification flag simultaneously with the content item. Additionally or alternatively, the system may display the verification flag on a secondary device (e.g., wireless user equipment 610). For example, the system sends a text message notification, push notification, or another indication to alert the user of the verification status of the content item. In some embodiments, the system may require user input (e.g., the user must reply to the text message notification, click "accept" on a push notification, or input another response to the indication of the verification flag).

Figure 11:
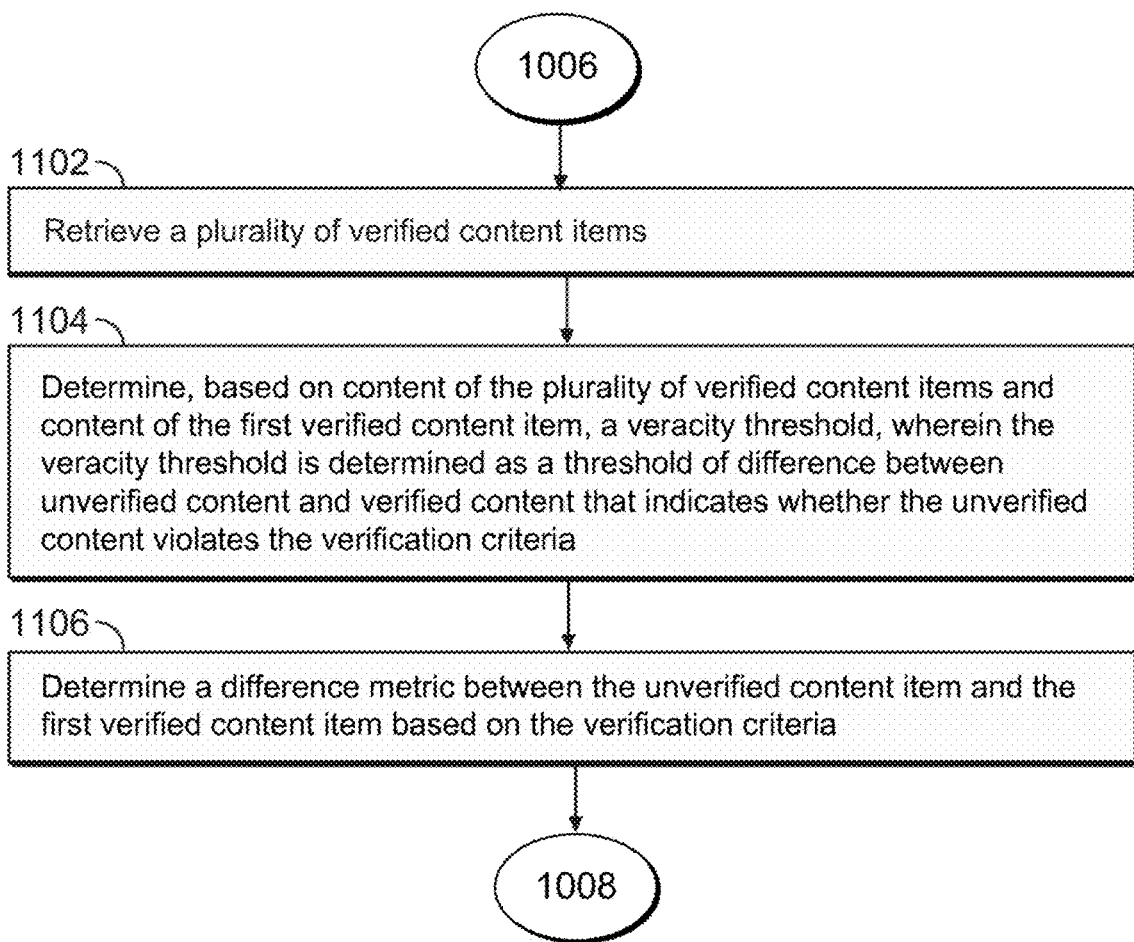
FIG. 11 is a flowchart of an illustrative process for determining, based on a difference metric and a veracity threshold, whether a content item violates verification criteria, in accordance with some embodiments of the present disclosure.

FIG. 11 is an illustrative process of determining whether the unverified content item violates the verification criteria. FIG. 11 continues from step 1006 in FIG. 10. In some embodiments, the system determines a veracity threshold. The system then compares the unverified content item with a first verified content item to determine a difference metric. By comparing the difference metric to the veracity threshold, the system determines whether the unverified content item violates the verification criteria.

At step 1102, the system retrieves a plurality of verified content items. In some embodiments, the system may retrieve verified content items with fingerprints that match the fingerprint of the unverified content item. The system may retrieve (e.g., using control circuitry 504) the verified content items from a database (e.g., media content source 602). Additionally or alternatively, the system may receive the verified content items via I/O path 502. The system may store the plurality of verified content items on local storage (e.g., storage 508) for future analyses.

At step 1104, the system may determine, based on content of the plurality of verified content items and content of the first verified content item, a veracity threshold. The veracity threshold is determined as a threshold of difference between unverified content and verified content that indicates whether the unverified content violates the verification criteria. In some embodiments, the threshold is determined based on user preferences that indicate acceptable levels of difference between an unverified content item and verified content. In some embodiments the threshold may comprise multiple layers, i.e., the threshold may have different values for different factors. For example, the system may have a high threshold for numbers of sources but a low threshold for replaced content (e.g., replaced frames or audio). The veracity threshold may be the combination of the thresholds for all the factors.

At step 1106, the system determines a difference metric between the unverified content item and the first verified content item based on the verification criteria. In some embodiments, the system may determine a difference metric for each factor. For example, the system determines that the first verified content item and the unverified content item have a low deviation in number of altered frames; thus the difference metric for alterations would be low. However, the system may determine that the first verified content item and the unverified content item have a high deviation in number of sources; thus the difference metric for number of sources would be high. The system may then combine the difference metrics for each factor to determine a holistic difference metric for the unverified content item.

The system may continue to step 1008 to determine whether the unverified content item violates the verification criteria. In some embodiments, determining whether the unverified content item violates the verification criteria comprises comparing the difference metric to the veracity threshold. In some embodiments, the system may compare the holistic difference metric to the veracity threshold as a single comparison. In some embodiments, the system may compare the difference metric for each factor to the threshold for that factor. The system may then determine how many thresholds were exceeded by the difference metrics.

In some embodiments, the system may determine whether the unverified content item violates the verification criteria based on the difference metrics. In some embodiments, based on user preferences or system configurations, the system may determine that the unverified content item violates the verification criteria if the difference metric for the unverified content item exceeds the veracity threshold. In some embodiments, based on user preferences or system configurations, the system may determine that the unverified content item violates the verification criteria if the difference metrics for a certain number of factors for the unverified content item exceed the corresponding thresholds for those factors. For example, the system contains a system configuration or receives a user preference (e.g., via user interface input 510) indicating how many difference metrics for specific factors may exceed the corresponding thresholds. In some embodiments, the system configuration or user preference may indicate that none of the difference metrics may exceed the corresponding thresholds. In some embodiments, the system configuration or user preference may indicate that two of the difference metrics may exceed the corresponding thresholds. In some embodiments, the system configuration or user preference may indicate that thirty percent of the difference metrics may exceed the corresponding thresholds. Based on the number of difference metrics that exceed the corresponding thresholds, the system may determine that the unverified content item violates the verification criteria. The system may then proceed to step 1010 or step 1012 based on whether or not the unverified content item violates the verification criteria.

Figure 12:
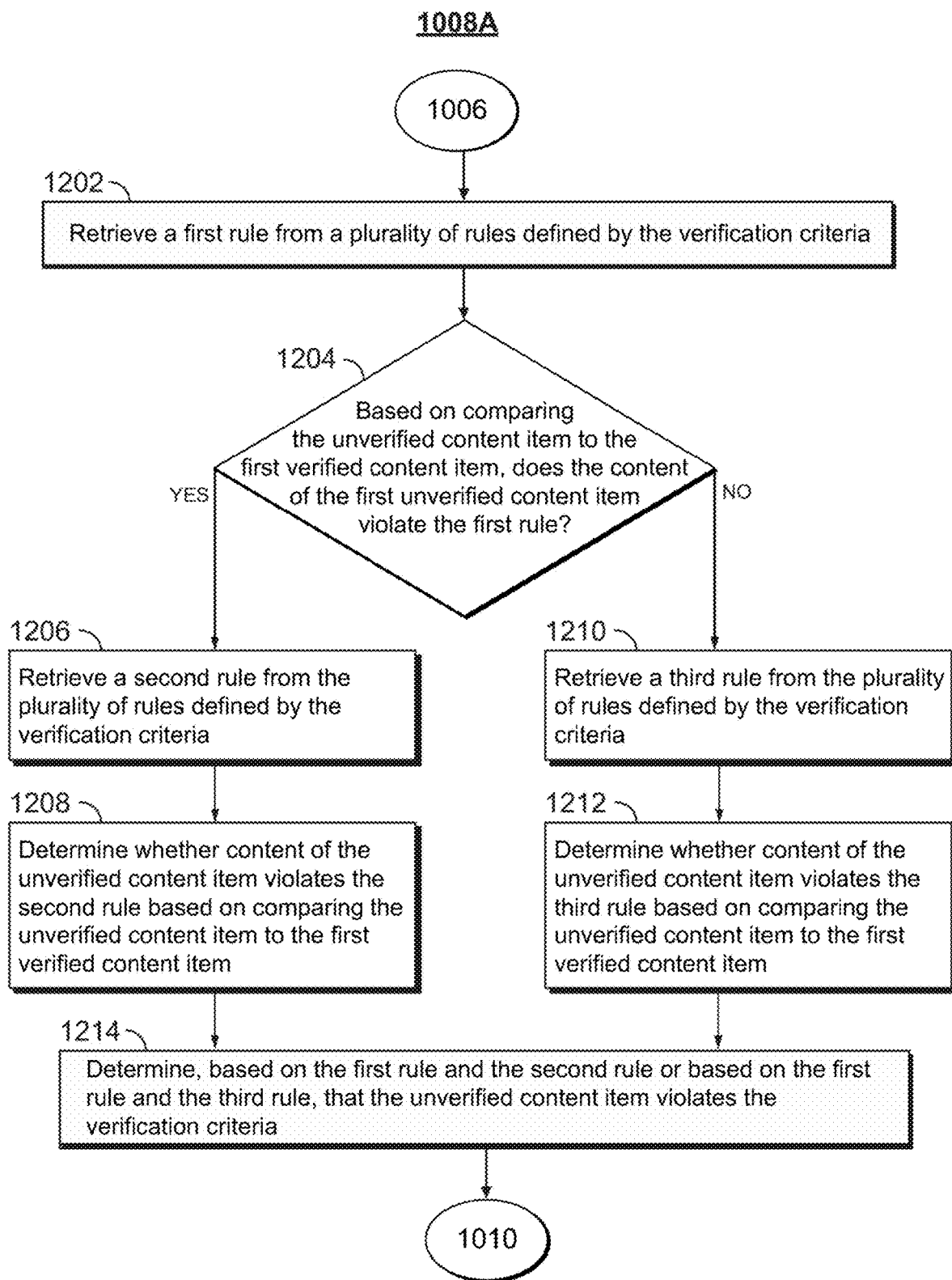
FIG. 12 is a flowchart of an illustrative process for determining, based on a set of rules, whether a content item violates verification criteria, in accordance with some embodiments of the present disclosure.
Figure 13:
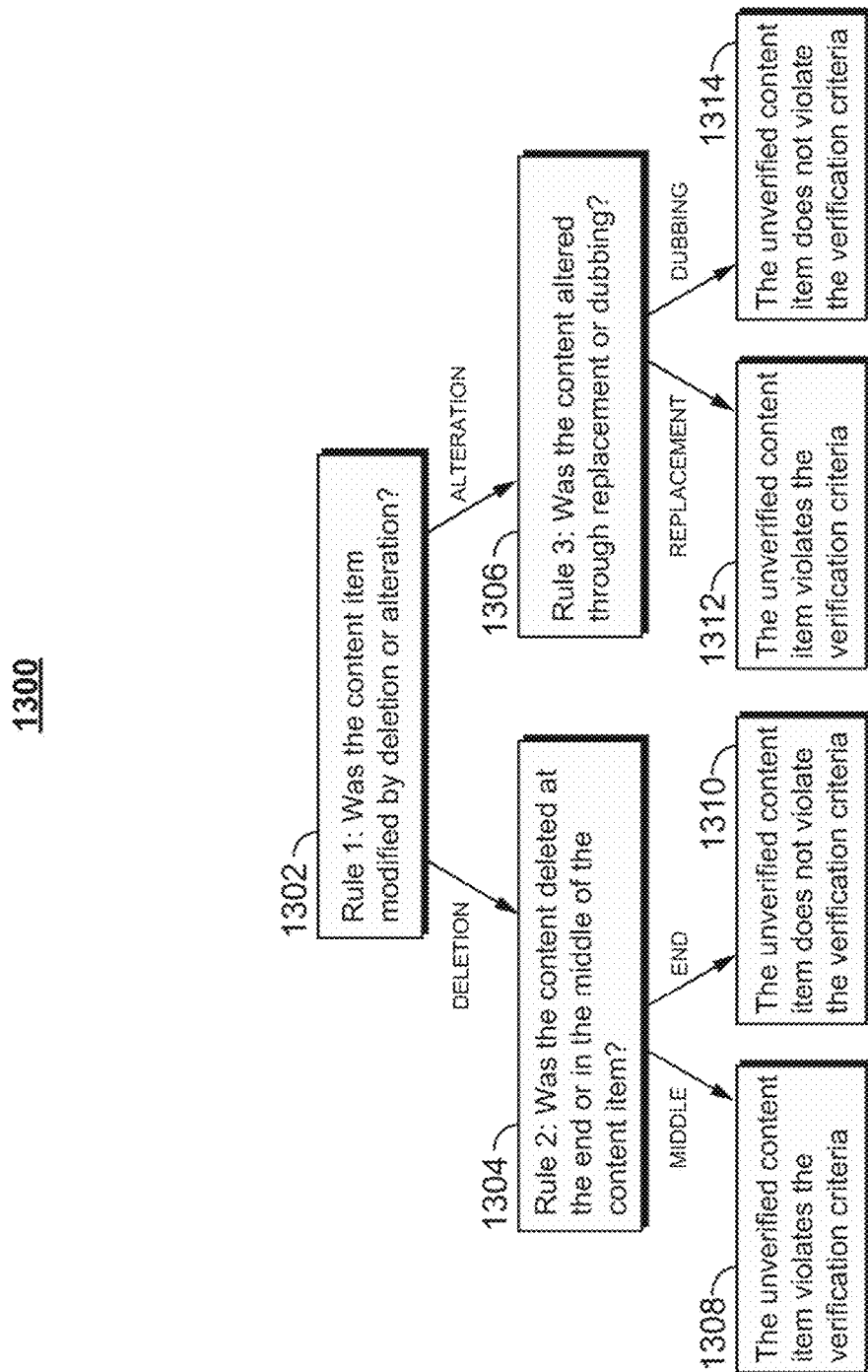
FIG. 13 shows an illustrative example of a chain of rules used to determine whether a content item violates verification criteria, in accordance with some embodiments of the present disclosure.

FIGS. 12 and 13 illustrate a process of determining whether the unverified content item violates the verification criteria. Based on programming, system configurations, user preferences or other settings, the system connects a series of rules in dependent chains. The system may then proceed through the chains of rules until it determines whether the unverified content item violates the verification criteria. In some embodiments, the rules, order of rules, and conclusions are customizable and programmable. For example, the system (e.g., control circuitry 504) may prompt the user to input user preferences (e.g., via user interface input 510) specifying which rules to chain together and in what order. In some embodiments, the rules may be pre-programmed into the system by the service provider.

At step 1202, the system retrieves a first rule from a plurality of rules defined by the verification criteria. The first rule may relate to a characteristic of the unverified content item or a characteristic of a modification of the content item.

For example, in FIG. 13, the first rule (e.g., box 1302) asks whether the unverified content item was modified by deletion or alteration. For example, if the content item is a video, then the system may analyze whether the video was modified through deleted frames or whether certain frames were modified (e.g., as in FIG. 2). In another example, if the content item is an audio track, then the system may analyze whether the audio track was modified through deleted portions or whether certain portions were modified (e.g., through changes of volume or pitch, added portions, or other modifications).

At step 1204, the system determines whether the content of the first unverified content item violates the first rule. In some embodiments, the system (e.g., using control circuitry 504) may analyze the fingerprint of the first unverified content item. The system may extract metadata relating to the first rule from the fingerprint of the first unverified content item. For example, if the first rule relates to the sources of the first unverified content item, the system may extract a number of sources and/or names of sources from the fingerprint of the first unverified content item.

In FIG. 13, the system may compare the first unverified content item to a first verified content item to determine the type of modifications. For example, the system determines, based on the comparison, that the first unverified content item is missing a number of frames that appear in the first verified content item. The system may therefore determine that the unverified content item was modified through deletion of content. In another example, the system may determine, based on the comparison of the first unverified content item to the first verified content item, that the two content items contain the same content but that some of the content was altered in the unverified content item. The system may therefore determine that the unverified content item was modified through alteration of content. If the system determines that the first unverified content item violates the first rule (e.g., in FIG. 13, the system determines that the content item was modified by deletion), then the system proceeds to step 1206 (i.e., box 1304). If the system determines that the first unverified content item did not violate the first rule (e.g., in FIG. 13, the system determines that the content item was modified by alteration but not by deletion), then the system proceeds to step 1210 (i.e., box 1306).

At step 1206, the system retrieves a second rule from the plurality of rules defined by the verification criteria. The second rule may relate to a second characteristic of the unverified content item or a second characteristic of a modification of the content item. The second rule may build upon the first rule or may simply add another layer of rules to the process. For example, in FIG. 13, the second rule (e.g., box 1304) builds upon the first rule. The second rule in this example asks whether the deletion of content occurred at the end of the first unverified content item or in the middle of the unverified content item. As discussed above in relation to FIGS. 3 and 4, a deletion of content in the middle of a content item may indicate an illegitimate modification while a deletion of content at the end of a content item is less likely to be an illegitimate modification.

At step 1208, the system determines whether content of the unverified content item violates the second rule based on comparing the unverified content item to the first verified content item. In some embodiments, the system (e.g., using control circuitry 504) may analyze the fingerprint of the first unverified content item. The system may extract metadata relating to the second rule from the fingerprint of the first unverified content item.

In FIG. 13, the system may compare the first unverified content item to a first verified content item to determine the location of the deleted content. If the first unverified content item is an audio track, the comparison may resemble the comparison in FIG. 3. If the first unverified content item is a video, the comparison may resemble the comparison in FIG. 4. Based on the comparison, the system determines whether the content was deleted at the end or in the middle of the unverified content item. If the content was deleted in the middle of the unverified content item, the system proceeds to box 1308. If the content was deleted at the end of the unverified content item, the system proceeds to box 1310.

At step 1210, the system retrieves a third rule from the plurality of rules defined by the verification criteria. The third rule may relate to a third characteristic of the unverified content item or a third characteristic of a modification of the content item. The second rule may build upon the first rule or may simply add another layer of rules to the process. For example, in FIG. 13, the third rule (e.g., box 1306) builds upon the first rule. The third rule in this example asks whether the content was altered through replacement or dubbing. As discussed above in relation to FIG. 3, an alteration to a content item through dubbing does not necessarily indicate an illegitimate modification. For example, a song or video may be dubbed into a remix or parody, and the modified content may not be deceptive even though it is altered. However, content that is merely replaced with other content—particularly if the replacement is small in relation to the length of the content item and if the replacement occurs in the middle of the content item—is indicative of an illegitimate modification. If the content was altered through replacement, the system proceeds to box 1312. If the content was altered through dubbing, the system proceeds to box 1314.

At step 1214, the system determines, based on the first rule and the second rule or based on the first rule and the third rule, that the unverified content item violates the verification criteria. The system may additionally include any number of additional rules for this determination, i.e., the chain of rules may continue and may include a number of additional tests for the unverified content item. As is discussed below in relation to FIG. 14, the system considers many factors including content type, clusters of altered content, percent altered content, modification types, sources, number of sources, time of release, and other factors. The system may test any of these factors with additional rules, e.g., with rules added onto the chain of rules in FIG. 12. The system may use a combination of system configurations, service provider programming, user preferences, and direct user input to determine the content and order of these rules. Once the system determines that the unverified content item violates the verification criteria, the system proceeds to step 1010 of FIG. 10.

In some embodiments, the system may run known verified content items against the series of rules. For example, the system may use known verified content items that contain edits, errors, noise, and a number of other known modifications. The system may use these known verified content items in order to test and adjust the rules. For example, the system is able to refine the sensitivity of the tests and redefine thresholds based on the results of the tests. Additionally or alternatively, the system may use previous iterations of the verification process (e.g., as described in relation to FIG. 12) to self-improve the process. For example, the system learns which modifications and combinations of alterations typically lead to low veracity and require alerting the user. The system may additionally or alternatively prompt the user for feedback regarding satisfaction with the results of the process. The system may prompt the user (e.g., via user interface input 510) to alert the system whenever a verification flag, risk factor, or other indication is deemed incorrect. The system may use this feedback to improve its processes.

In FIG. 13, the system combines the results of the first and second rules or the results of the first and third rules to determine whether the unverified content item violates the verification criteria. For example, if the unverified content item was modified by deletion and the deletion occurred in the middle of the unverified content item, then the system determines that the unverified content item violates the verification criteria (e.g., box 1308). However, if the unverified content item was modified by deletion and the deletion occurred at the end of the unverified content item, then the system determines that the unverified content item does not violate the verification criteria (e.g., box 1310). In another example, if the unverified content item was modified by alteration and the alteration was a replacement, then the system determines that the unverified content item violates the verification criteria (e.g., box 1312). However, if the unverified content item was modified by alteration and the alteration was through dubbing, then the system determines that the unverified content item does not violate the verification criteria (e.g., box 1314). The chain of rules in FIG. 13 is merely exemplary and may include any number of additional layers of rules. The chain of rules may additionally or alternatively have branches with different numbers of rules. The chain of rules may additionally or alternatively have any number of conclusions based on the preceding rules. The chain of rules may use a combination of system configurations, service provider programming, user preferences, and direct user input to determine the content and order of these rules.

FIG. 14 is an illustrative example of factors used to calculate veracity level and risk factor. In some embodiments, the risk factor may be based upon the veracity level. Content type determines which set of rules the system follows when analyzing the factors. For example, a small number of modifications in a video is indicative of an illegitimate content item while a large number of modifications in a picture is indicative of an illegitimate content item. The clusters of altered content indicate how concentrated or dispersed the modifications are, and how large each modification is. The percent of altered content indicates how much of the overall content item has been modified. The modification type further impacts the legitimacy of the content item. For example, added or deleted content may not affect the legitimacy of the content while altered content may lower the legitimacy of the content item.

In some embodiments, the source may also impact the legitimacy, as discussed below. The number of sources further impacts the legitimacy of the content item. For example, if there are many sources of content items that match the unverified content item, and particularly if the sources released the content items at the same time, there may have been an attempt to disseminate a large number of fraudulent content items to many people. Thus, a large number of sources may decrease the legitimacy of the content item. The system may analyze all of these factors when determining a veracity score through an algorithm, calculation, or other method. The system may then determine, based on the veracity level, what risk factor to assign to the content item. The system may also consider content type and content item when determining the risk factor. For example, the system determines that a news clip requires a higher veracity score than a sports clip in order to be considered acceptable. Therefore, even a slight loss of legitimacy in a news clip may heavily impact the risk factor while a slight loss of legitimacy in a movie may only slightly impact the risk factor.

The system may analyze the source of the content to determine legitimacy of a content item. In some embodiments, the system may identify a source of an unverified content item. The system may then compare an identifier of the source of the unverified content item with a corresponding identifier of each of a plurality of identifiers of verified sources. The system may extract an identifier of the source from the metadata of the content item, may retrieve a stored indicator from local storage (e.g., storage 508), or may determine the source in another manner. Based on determining that the identifier of the source matches an identifier in the plurality of verified sources, the system may then store an indication that the altered frame was received from a verified source. The system may store the indication that the altered frame was received from a verified source in the metadata of the content item or in local storage (e.g., storage 508). The presence of an indication that the altered frame was received from a verified source may cause the system to increase the veracity level of the content item.

Content item 1402 is a news clip. The type of content item 1402 is a video. There are three clusters of modified frames. The first modification covers 200 frames, the second modification covers 100 frames, and the third modification covers 100 frames. Because these clusters comprise a relatively small number of frames, the cluster size of content item 1402 is indicative of illegitimate content. Thus, the clusters bring down the veracity score of content item 1402. Furthermore, 0.4% of the overall content item has been modified, and the modifications comprise altered frames. Thus, there have been small tweaks to a small number of frames in the video. In this example, the verification criteria for videos indicate that this type of change is indicative of a lower veracity score. Furthermore, the number of sources of matching content is high, indicating that there may have been a mass release of illegitimate content onto the Internet. Based on all these factors, the system determines that the veracity level is 5% and the risk factor is high.

Content item 1404 is a music video. The type of content item 1404 is a video. There are two clusters of modified frames: the first cluster comprises 1200 frames and the second cluster comprises 1200 frames. A total of 3% of content item 1404 was included in these modifications. Furthermore, the modifications involve added and deleted frames. For a video, the higher number of modified frames and the type of modification indicates that content item 1404 may be legitimate. For example, the modifications may comprise replacing an introduction or conclusion, adding a parody of a portion of the content item, or another significant change. The low number of sources of matching content is likewise indicative of a legitimate content item. Based on all these factors, the system determines that the veracity level is 95% and the risk factor is low.

Content item 1406 is an interview soundbyte, and the type of content item 1406 is audio. There are two modified portions, and both modified portions are one second long. The altered content comprises 1% of the length of content item 1406. For audio content items, small modifications are typically indicative of illegitimate content. The modifications of content item 1406 are relatively small, and the modifications comprise added audio and deleted audio. These modifications are not strong indicators of illegitimate content but these factors may cause the system to lower the veracity score. The source of content item 1406 is a broadcast news channel, which adds legitimacy to content item 1406 and raises the veracity score. The number of sources of matching content is relatively low, which also raises the veracity score. Therefore, the system determines that the veracity score is 55% and the risk factor is medium.

Content item 1408 is a screenshot with the content type being an image. The clusters of altered content are 600 pixels by 1500 pixels. This altered content comprises approximately 12.5% of content item 1408. For images, a large percentage of altered content is indicative of illegitimate content. For example, an image may have a person cropped into the background, or an object may be removed. Such large changes are more indicative of illegitimate content than a small change such as a change to the size or shape of the image or a change to the color of an object. Content item 1408 has an altered portion, which is indicative of an illegitimate modification. Furthermore, content item 1408 was shared on a social media platform approximately 25,000 times. This indicates that distribution of the content item 1408 may not be monitored or controlled, thus increasing the likelihood that it is illegitimate. Therefore, the system may determine that the veracity level of content item 1408 is 10% and the risk factor is medium-high.

The factors depicted in FIG. 14 may be entered into a chain of rules (e.g., as illustrated in FIG. 13) to determine veracity level and risk factor. For example, each factor may be turned into a rule and the rules may be strung together into chains that inform the system whether the content item has veracity. The system may use a combination of system configurations, service provider programming, user preferences, and direct user input to determine the content and order of these rules.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
    identifying a first root frame in an unverified content item;
    identifying a verified content item comprising a second root frame that matches the first root frame in the unverified content item;
    comparing a plurality of frames following the first root frame in the unverified content item to corresponding frames in the verified content item;
    identifying, based on the comparing, at least one altered frame in the unverified content item; and
    in response to identifying the at least one altered frame, generating for display an indication that the unverified content item contains one or more altered frames.

2. The method of claim 1, further comprising:
    generating a fingerprint for the unverified content item; and
    identifying the verified content item based on the fingerprint.

3. The method of claim 2, wherein the fingerprint comprises at least one of a text string, identifying information, at least one link to an external database, information connecting the fingerprint to other fingerprints, and other forms of metadata associated with a content item of a collection of accessible content items.

4. The method of claim 3, wherein identifying the verified content item based on the fingerprint comprises:
    extracting data from a plurality of frames corresponding to the unverified content item;
    generating, based on the extracted data, the fingerprint; and
    searching at least one database for the verified content item comprising data corresponding to the fingerprint.

5. The method of claim 1, wherein identifying the verified content item comprising the second root frame that matches the first root frame in the unverified content item comprises:
    selecting a first frame from the unverified content item;
    iterating through each frame of the verified content item until a frame within the verified content item matches the first frame of the unverified content item; and
    setting the frame within the verified content item that matches the first frame as the second root frame.

6. The method of claim 1, wherein comparing the plurality of frames following the first root frame in the unverified content item to the corresponding frames in the verified content item comprises:
    retrieving a first identifier associated with a frame sequentially following the first root frame of the unverified content item and a second identifier associated with a corresponding frame sequentially following the second root frame of the verified content item;
    retrieving, using the first identifier, a first frame of the unverified content item, and using the second identifier, a second frame of the verified content item; and
    determining whether the first frame matches the second frame.

7. The method of claim 6, wherein the verified content item is a first verified content item, and wherein identifying the at least one altered frame in the unverified content item comprises:
    determining that the first frame and the second frame do not correspond to a same frame; and
    based on determining that the first frame and the second frame do not correspond to the same frame:
        identifying a second verified content item;
        retrieving a third identifier associated with a frame sequentially following a third root frame of the second verified content item;
        retrieving, using the third identifier, a third frame from the second verified content item;
        determining that the third frame matches the second frame and does not match the first frame; and
        based on determining that the third frame matches the second frame and does not match the first frame, identifying the first frame as an altered frame.

8. The method of claim 1, further comprising:
    identifying a source of the unverified content item;
    comparing an identifier of the source of the unverified content item with a corresponding identifier of each of a plurality of identifiers of verified sources; and
    based on determining that the identifier of the source matches an identifier in the plurality of identifiers of verified sources, storing an indication that the altered frame was received from a verified source.

9. The method of claim 1, wherein comparing the plurality of frames following the first root frame in the unverified content item to corresponding frames in the verified content item comprises:
- extracting audio data from the each of the plurality of frames following the first root frame of the unverified content item and corresponding frames in the verified content item; and
- determining an extent to which audio data is different between audio data of the plurality of frames following the first root frame of the unverified content item and corresponding audio data from corresponding frames in the verified content item.

10. The method of claim 9, further comprising:
- comparing the audio data of the plurality of frames following the first root frame of the unverified content item and the corresponding audio data from corresponding frames in the verified content item; and
- in response to determining that the audio data for the unverified content item has been altered, generating for display an indication of the extent to which the audio data is different between the audio data of the plurality of frames following the first root frame of the unverified content item and the corresponding audio data from the corresponding frames in the verified content item.

11. A system comprising:
- memory configured to store at least one content item;
- control circuitry configured to:
  - identify a first root frame in an unverified content item;
  - identify a verified content item comprising a second root frame that matches the first root frame in the unverified content item;
  - compare a plurality of frames following the first root frame in the unverified content item to corresponding frames in the verified content item;
  - identify, based on the comparing, at least one altered frame in the unverified content item; and
  - in response to identifying the at least one altered frame, generate for display an indication that the unverified content item contains one or more altered frames.

12. The system of claim 11, wherein the control circuitry is further configured to:
- generate a fingerprint for the unverified content item; and
- identify the verified content item based on the fingerprint.

13. The system of claim 12, wherein the fingerprint comprises at least one of a text string, identifying information, at least one link to an external database, information connecting the fingerprint to other fingerprints, and other forms of metadata associated with a content item of a collection of accessible content items.

14. The system of claim 13, wherein the control circuitry, when identifying the verified content item based on the fingerprint, is configured to:
- extract data from a plurality of frames corresponding to the unverified content item;
- generate, based on the extracted data, the fingerprint; and
- search at least one database for the verified content item comprising data corresponding to the fingerprint.

15. The system of claim 11, wherein the control circuitry, when identifying the verified content item comprising the second root frame that matches the first root frame in the unverified content item, is configured to:
- select a first frame from the unverified content item;
- iterate through each frame of the verified content item until a frame within the verified content item matches the first frame of the unverified content item; and
- set the frame within the verified content item that matches the first frame as the second root frame.

16. The system of claim 11, wherein the control circuitry, when comparing the plurality of frames following the first root frame in the unverified content item to the corresponding frames in the verified content item, is configured to:
- retrieve a first identifier associated with a frame sequentially following the first root frame of the unverified content item and a second identifier associated with a corresponding frame sequentially following the second root frame of the verified content item;
- retrieve, using the first identifier, a first frame of the unverified content item, and using the second identifier, a second frame of the verified content item; and
- determine whether the first frame matches the second frame.

17. The system of claim 16, wherein the verified content item is a first verified content item, and wherein the control circuitry, when identifying the at least one altered frame in the unverified content item, is configured to:
- determine that the first frame and the second frame do not correspond to a same frame; and
- based on determining that the first frame and the second frame do not correspond to the same frame:
  - identify a second verified content item;
  - retrieve a third identifier associated with a frame sequentially following a third root frame of the second verified content item;
  - retrieve, using the third identifier, a third frame from the second verified content item;
  - determine that the third frame matches the second frame and does not match the first frame; and
  - based on determining that the third frame matches the second frame and does not match the first frame, identify the first frame as an altered frame.

18. The system of claim 11, wherein the control circuitry is further configured to:
- identify a source of the unverified content item;
- compare an identifier of the source of the unverified content item with a corresponding identifier of each of a plurality of identifiers of verified sources; and
- based on determining that the identifier of the source matches an identifier in the plurality of identifiers of verified sources, store an indication that the altered frame was received from a verified source.

19. The system of claim 11, wherein the control circuitry, when comparing the plurality of frames following the first root frame in the unverified content item to corresponding frames in the verified content item, is configured to:
- extract audio data from the each of the plurality of frames following the first root frame of the unverified content item and corresponding frames in the verified content item; and
- determine an extent to which audio data is different between audio data of the plurality of frames following the first root frame of the unverified content item and corresponding audio data from corresponding frames in the verified content item.

20. The system of claim 19, wherein the control circuitry is further configured to:
- compare the audio data of the plurality of frames following the first root frame of the unverified content item and the corresponding audio data from corresponding frames in the verified content item; and
- in response to determining that the audio data for the unverified content item has been altered, generate for display an indication of the extent to which the audio data is different between the audio data of the plurality of frames following the first root frame of the unverified content item and the corresponding audio data from the corresponding frames in the verified content item.

* * * * *